United States Patent
Mann, III et al.

(10) Patent No.: US 7,783,578 B2
(45) Date of Patent: Aug. 24, 2010

(54) SYSTEM FOR PROVIDING CARDLESS PAYMENT

(75) Inventors: William Frederick Mann, III, Avondale, PA (US); Jeffrey L. Hirka, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 61 days.

(21) Appl. No.: 11/338,656

(22) Filed: Jan. 25, 2006

(65) Prior Publication Data

US 2006/0122943 A1 Jun. 8, 2006

Related U.S. Application Data

(63) Continuation of application No. 09/956,997, filed on Sep. 21, 2001, now Pat. No. 7,103,576.

(51) Int. Cl.
*G06F 17/60* (2006.01)
*H04K 1/00* (2006.01)

(52) U.S. Cl. .............. 705/64; 705/65; 705/66; 705/67; 705/72; 380/28; 380/29; 380/31

(58) Field of Classification Search .......... 705/64, 705/65, 72, 75
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |

(Continued)

FOREIGN PATENT DOCUMENTS

DE 19731293 1/1999

(Continued)

OTHER PUBLICATIONS

Kutler, A Different Drummer on the Data Highway, American Banker, Section: No. 91, vol. 160, May 12, 1995, p. 14.

(Continued)

*Primary Examiner*—Charles C Agwumezie
(74) *Attorney, Agent, or Firm*—Hunton & Williams, LLP

(57) ABSTRACT

The method and system of the invention provide a variety of techniques for using a selected alias and a selected personal identification entry (PIE) in conjunction with use of a transaction card, such as a credit card, debit card or stored value card, for example. A suitable number or other identification parameter is selected by the account-holder as an alias. The account-holder is then required to choose a PIE for security purposes. The alias is linked to the account-holder's credit card number via a database. When the account-holder enters into a transaction with a merchant, the physical card need not be present. The account-holder simply provides his or her alias and then the PIE. This can be done at any point of sale such as a store, catalog telephone order, or over the Internet. The alias and PIE are entered and authorization is returned from the credit card company.

30 Claims, 11 Drawing Sheets

U.S. PATENT DOCUMENTS

| | | |
|---|---|---|
| 4,713,761 A | 12/1987 | Sharpe et al. |
| 4,720,860 A | 1/1988 | Weiss |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,479 A | 9/1995 | Alesio et al. |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn et al. |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |

| | | | | | | |
|---|---|---|---|---|---|---|
| 5,826,245 A | 10/1998 | Sandberg-Diment | | 5,950,174 A | 9/1999 | Brendzel |
| 5,826,250 A | 10/1998 | Trefler | | 5,950,206 A | 9/1999 | Krause |
| 5,828,734 A | 10/1998 | Katz | | 5,952,639 A | 9/1999 | Ohki et al. |
| 5,828,751 A | 10/1998 | Walker et al. | | 5,952,641 A | 9/1999 | Korshun |
| 5,828,812 A | 10/1998 | Khan et al. | | 5,953,710 A | 9/1999 | Fleming |
| 5,828,833 A | 10/1998 | Belville et al. | | 5,956,695 A | 9/1999 | Carrithers et al. |
| 5,832,460 A | 11/1998 | Bednar | | 5,958,007 A | 9/1999 | Lee et al. |
| 5,832,476 A | 11/1998 | Tada | | 5,960,411 A | 9/1999 | Hartman et al. |
| 5,835,087 A | 11/1998 | Herz | | 5,961,593 A | 10/1999 | Gabber et al. |
| 5,835,580 A | 11/1998 | Fraser | | 5,963,635 A | 10/1999 | Szlam et al. |
| 5,835,603 A | 11/1998 | Coutts | | 5,963,925 A | 10/1999 | Kolling et al. |
| 5,838,906 A | 11/1998 | Doyle | | 5,963,952 A | 10/1999 | Smith |
| 5,842,178 A | 11/1998 | Giovannoli | | 5,963,953 A | 10/1999 | Cram et al. |
| 5,842,211 A | 11/1998 | Horadan | | 5,966,695 A | 10/1999 | Melchione et al. |
| 5,844,553 A | 12/1998 | Hao | | 5,966,699 A | 10/1999 | Zandi |
| 5,845,259 A | 12/1998 | West et al. | | 5,967,896 A | 10/1999 | Jorasch et al. |
| 5,845,260 A | 12/1998 | Nakano et al. | | 5,969,318 A | 10/1999 | Mackenthun |
| 5,847,709 A | 12/1998 | Card | | 5,970,143 A | 10/1999 | Schneier et al. |
| 5,848,143 A | 12/1998 | Andrews | | 5,970,470 A | 10/1999 | Walker et al. |
| 5,848,400 A | 12/1998 | Chang | | 5,970,478 A | 10/1999 | Walker et al. |
| 5,848,427 A | 12/1998 | Hyodo | | 5,970,482 A | 10/1999 | Pham |
| 5,852,812 A | 12/1998 | Reeder | | 5,970,483 A | 10/1999 | Evans |
| 5,857,079 A | 1/1999 | Claus et al. | | 5,978,467 A | 11/1999 | Walker et al. |
| 5,862,223 A | 1/1999 | Walker | | 5,983,196 A | 11/1999 | Wendkos |
| 5,864,830 A | 1/1999 | Armetta et al. | | 5,987,434 A | 11/1999 | Libman |
| RE36,116 E | 2/1999 | McCarthy | | 5,987,498 A | 11/1999 | Athing et al. |
| 5,870,718 A | 2/1999 | Spector | | 5,991,736 A | 11/1999 | Ferguson et al. |
| 5,870,724 A | 2/1999 | Lawlor | | 5,991,738 A | 11/1999 | Ogram |
| 5,870,725 A | 2/1999 | Belinger et al. | | 5,991,748 A | 11/1999 | Taskett |
| 5,871,398 A | 2/1999 | Schneier et al. | | 5,991,751 A | 11/1999 | Rivette et al. |
| 5,873,072 A | 2/1999 | Kight | | 5,991,780 A | 11/1999 | Rivette |
| 5,873,096 A | 2/1999 | Lim | | 5,995,948 A | 11/1999 | Whitford |
| 5,878,141 A * | 3/1999 | Daly et al. .................. 705/78 | | 5,995,976 A | 11/1999 | Walker et al. |
| 5,880,769 A | 3/1999 | Nemirofsky | | 5,999,596 A | 12/1999 | Walker et al. |
| 5,883,810 A | 3/1999 | Franklin et al. | | 5,999,907 A | 12/1999 | Donner |
| 5,884,032 A | 3/1999 | Bateman | | 6,000,033 A | 12/1999 | Kelly et al. |
| 5,884,270 A | 3/1999 | Walker et al. | | 6,001,016 A | 12/1999 | Walker et al. |
| 5,884,272 A | 3/1999 | Walker et al. | | 6,003,762 A | 12/1999 | Hayashida |
| 5,884,274 A | 3/1999 | Walker et al. | | 6,005,939 A | 12/1999 | Fortenberry et al. |
| 5,884,288 A | 3/1999 | Chang | | 6,006,205 A | 12/1999 | Loeb et al. |
| 5,889,863 A | 3/1999 | Weber | | 6,006,249 A | 12/1999 | Leong |
| 5,892,900 A | 4/1999 | Ginter et al. | | 6,009,415 A | 12/1999 | Shurling et al. |
| 5,898,780 A | 4/1999 | Liu et al. | | 6,009,442 A | 12/1999 | Chen et al. |
| 5,899,982 A | 5/1999 | Randle | | 6,010,404 A | 1/2000 | Walker et al. |
| 5,903,881 A | 5/1999 | Schrader | | 6,012,088 A | 1/2000 | Li et al. |
| 5,909,486 A | 6/1999 | Walker et al. | | 6,012,983 A | 1/2000 | Walker et al. |
| 5,910,988 A | 6/1999 | Ballard | | 6,014,439 A | 1/2000 | Walker et al. |
| 5,913,202 A | 6/1999 | Motoyama | | 6,014,635 A | 1/2000 | Harris et al. |
| 5,914,472 A | 6/1999 | Foladare et al. | | 6,014,636 A | 1/2000 | Reeder |
| 5,915,244 A | 6/1999 | Jack et al. | | 6,014,638 A | 1/2000 | Burge et al. |
| 5,918,214 A | 6/1999 | Perkowski | | 6,014,641 A | 1/2000 | Loeb et al. |
| 5,918,217 A | 6/1999 | Maggioncalda | | 6,014,645 A | 1/2000 | Cunningham |
| 5,918,239 A | 6/1999 | Allen et al. | | 6,016,810 A | 1/2000 | Ravenscroft |
| 5,920,847 A | 7/1999 | Kolling et al. | | 6,018,714 A | 1/2000 | Risen, Jr. |
| 5,921,864 A | 7/1999 | Walker et al. | | 6,018,718 A | 1/2000 | Walker et al. |
| 5,923,763 A | 7/1999 | Walker et al. | | 6,024,640 A | 2/2000 | Walker et al. |
| 5,926,796 A | 7/1999 | Walker et al. | | 6,026,398 A | 2/2000 | Brown et al. |
| 5,926,812 A | 7/1999 | Hilsenrath | | 6,026,429 A | 2/2000 | Jones et al. |
| 5,930,764 A | 7/1999 | Melchione | | 6,032,134 A | 2/2000 | Weissman |
| 5,933,816 A | 8/1999 | Zeanah et al. | | 6,032,147 A | 2/2000 | Williams et al. |
| 5,933,817 A | 8/1999 | Hucal | | 6,038,547 A | 3/2000 | Casto |
| 5,933,823 A | 8/1999 | Cullen | | 6,038,552 A | 3/2000 | Fleischl et al. |
| 5,933,827 A | 8/1999 | Cole et al. | | 6,042,006 A | 3/2000 | Van Tilburg et al. |
| 5,937,068 A * | 8/1999 | Audebert .................. 713/185 | | 6,044,362 A | 3/2000 | Neely |
| 5,940,812 A | 8/1999 | Tengel et al. | | 6,045,039 A | 4/2000 | Stinson et al. |
| 5,943,656 A | 8/1999 | Crooks | | 6,047,268 A * | 4/2000 | Bartoli et al. .................. 705/35 |
| 5,944,824 A | 8/1999 | He | | 6,049,778 A | 4/2000 | Walker et al. |
| 5,945,653 A | 8/1999 | Walker et al. | | 6,049,782 A | 4/2000 | Gottesman et al. |
| 5,946,388 A | 8/1999 | Walker et al. | | 6,049,835 A | 4/2000 | Gagnon |
| 5,947,747 A | 9/1999 | Walker et al. | | 6,055,637 A | 4/2000 | Hudson et al. |
| 5,949,044 A | 9/1999 | Walker et al. | | 6,061,665 A | 5/2000 | Bahreman |
| 5,949,875 A | 9/1999 | Walker et al. | | 6,064,987 A | 5/2000 | Walker et al. |
| 5,950,173 A | 9/1999 | Perkowski | | 6,065,120 A | 5/2000 | Laursen et al. |

| | | | | | | |
|---|---|---|---|---|---|---|
| 6,065,675 | A | 5/2000 | Teicher | 6,253,327 | B1 | 6/2001 | Zhang et al. |
| 6,070,147 | A | 5/2000 | Harms et al. | 6,253,328 | B1 | 6/2001 | Smith, Jr. |
| 6,070,153 | A | 5/2000 | Simpson | 6,260,026 | B1 | 7/2001 | Tomida et al. |
| 6,070,244 | A | 5/2000 | Orchier et al. | 6,266,648 | B1 | 7/2001 | Baker, III |
| 6,073,105 | A | 6/2000 | Sutcliffe et al. | 6,266,683 | B1 | 7/2001 | Yehuda et al. |
| 6,073,113 | A | 6/2000 | Guinan | 6,267,292 | B1 | 7/2001 | Walker et al. |
| 6,075,519 | A | 6/2000 | Okatani et al. | 6,269,348 | B1 | 7/2001 | Pare et al. |
| 6,076,072 | A | 6/2000 | Libman | 6,275,944 | B1 | 8/2001 | Kao et al. |
| 6,081,790 | A | 6/2000 | Rosen | 6,289,322 | B1 | 9/2001 | Kitchen et al. |
| 6,081,810 | A | 6/2000 | Rosenzweig et al. | 6,298,330 | B1 | 10/2001 | Gardenswartz et al. |
| 6,085,168 | A | 7/2000 | Mori et al. | 6,298,356 | B1 | 10/2001 | Jawahar et al. |
| 6,088,444 | A | 7/2000 | Walker et al. | 6,301,567 | B1 | 10/2001 | Leong et al. |
| 6,088,451 | A | 7/2000 | He et al. | 6,308,273 | B1 | 10/2001 | Goertzel et al. |
| 6,088,683 | A | 7/2000 | Jalili | 6,308,274 | B1 | 10/2001 | Swift |
| 6,088,686 | A | 7/2000 | Walker et al. | 6,311,275 | B1 | 10/2001 | Jin et al. |
| 6,088,700 | A | 7/2000 | Larsen et al. | 6,317,838 | B1 | 11/2001 | Baize |
| 6,091,817 | A | 7/2000 | Bertina et al. | 6,324,524 | B1 | 11/2001 | Lent et al. |
| 6,092,196 | A | 7/2000 | Reiche | 6,327,573 | B1 | 12/2001 | Walker et al. |
| 6,095,412 | A | 8/2000 | Bertina et al. | 6,327,578 | B1 * | 12/2001 | Linehan ...................... 705/65 |
| 6,098,070 | A | 8/2000 | Maxwell | 6,332,192 | B1 | 12/2001 | Boroditisky et al. |
| 6,101,486 | A | 8/2000 | Roberts et al. | 6,336,104 | B1 | 1/2002 | Walker et al. |
| 6,104,716 | A | 8/2000 | Crichton et al. | 6,341,724 | B2 | 1/2002 | Campisano |
| 6,105,012 | A | 8/2000 | Chang et al. | 6,343,279 | B1 | 1/2002 | Bissonette et al. |
| 6,105,865 | A | 8/2000 | Hardesty | 6,345,261 | B1 | 2/2002 | Feidelson |
| 6,111,858 | A | 8/2000 | Greaves et al. | 6,349,242 | B2 | 2/2002 | Mahaffey |
| 6,112,181 | A | 8/2000 | Shear et al. | 6,349,336 | B1 | 2/2002 | Sit et al. |
| 6,115,690 | A | 9/2000 | Wong | 6,366,682 | B1 * | 4/2002 | Hoffman et al. ............ 382/115 |
| 6,119,093 | A | 9/2000 | Walker et al. | 6,385,591 | B1 | 5/2002 | Mankoff |
| 6,119,099 | A | 9/2000 | Walker et al. | 6,385,652 | B1 | 5/2002 | Brown et al. |
| 6,128,599 | A | 10/2000 | Walker et al. | 6,401,125 | B1 | 6/2002 | Makarios et al. |
| 6,128,602 | A | 10/2000 | Northington et al. | 6,401,211 | B1 | 6/2002 | Brezak, Jr. et al. |
| 6,131,810 | A | 10/2000 | Weiss et al. | 6,408,389 | B2 | 6/2002 | Grawrock et al. |
| 6,134,549 | A | 10/2000 | Regnier et al. | 6,418,457 | B1 | 7/2002 | Schmidt et al. |
| 6,134,592 | A | 10/2000 | Montulli | 6,438,594 | B1 | 8/2002 | Bowman-Amuah |
| 6,135,349 | A | 10/2000 | Zirkel | 6,438,666 | B2 | 8/2002 | Cassagnol et al. |
| 6,138,106 | A | 10/2000 | Walker et al. | 6,449,765 | B1 | 9/2002 | Ballard |
| 6,138,118 | A | 10/2000 | Koppstein et al. | 6,453,353 | B1 | 9/2002 | Win et al. |
| 6,141,651 | A | 10/2000 | Riley et al. | 6,460,141 | B1 | 10/2002 | Olden |
| 6,141,666 | A | 10/2000 | Tobin | 6,493,677 | B1 | 12/2002 | von Rosen et al. |
| 6,144,946 | A | 11/2000 | Iwamura | 6,493,685 | B1 | 12/2002 | Ensel et al. |
| 6,144,948 | A | 11/2000 | Walker et al. | 6,496,855 | B1 | 12/2002 | Hunt et al. |
| 6,145,086 | A | 11/2000 | Bellemore et al. | 6,496,936 | B1 | 12/2002 | French et al. |
| 6,148,293 | A | 11/2000 | King | 6,510,523 | B1 | 1/2003 | Perlman et al. |
| 6,151,584 | A | 11/2000 | Papierniak et al. | 6,526,404 | B1 | 2/2003 | Slater et al. |
| 6,154,750 | A | 11/2000 | Roberge et al. | 6,532,284 | B2 | 3/2003 | Walker et al. |
| 6,154,879 | A | 11/2000 | Pare et al. | 6,535,855 | B1 | 3/2003 | Cahill et al. |
| 6,161,182 | A | 12/2000 | Nadooshan | 6,535,917 | B1 | 3/2003 | Zamanzadeh et al. |
| 6,163,771 | A * | 12/2000 | Walker et al. .................. 705/18 | 6,535,980 | B1 | 3/2003 | Kumar et al. |
| 6,164,533 | A | 12/2000 | Barton | 6,539,424 | B1 | 3/2003 | Dutta |
| 6,170,011 | B1 | 1/2001 | Beck et al. | 6,557,039 | B1 | 4/2003 | Leong et al. |
| 6,178,511 | B1 | 1/2001 | Cohen et al. | 6,574,348 | B1 | 6/2003 | Venkatesan et al. |
| 6,182,052 | B1 | 1/2001 | Fulton et al. | 6,581,040 | B1 | 6/2003 | Wright et al. |
| 6,182,142 | B1 | 1/2001 | Win et al. | 6,584,505 | B1 | 6/2003 | Howard et al. |
| 6,182,225 | B1 | 1/2001 | Hagiuda et al. | 6,584,508 | B1 | 6/2003 | Epstein et al. |
| 6,185,242 | B1 | 2/2001 | Arthur et al. | 6,592,044 | B1 | 7/2003 | Wong et al. |
| 6,189,029 | B1 | 2/2001 | Fuerst | 6,609,113 | B1 | 8/2003 | O'Leary et al. |
| 6,195,644 | B1 | 2/2001 | Bowie | 6,609,125 | B1 | 8/2003 | Layne et al. |
| 6,199,077 | B1 | 3/2001 | Inala et al. | 6,609,198 | B1 | 8/2003 | Wood et al. |
| 6,201,948 | B1 | 3/2001 | Cook et al. | 6,609,654 | B1 | 8/2003 | Anderson et al. |
| 6,202,005 | B1 | 3/2001 | Mahaffey | 6,618,579 | B1 | 9/2003 | Smith et al. |
| 6,202,054 | B1 | 3/2001 | Lawlor et al. | 6,618,806 | B1 | 9/2003 | Brown et al. |
| 6,202,151 | B1 | 3/2001 | Musgrave et al. | 6,623,415 | B2 | 9/2003 | Gates et al. |
| 6,208,978 | B1 | 3/2001 | Walker et al. | 6,668,322 | B1 | 12/2003 | Wood et al. |
| 6,208,984 | B1 | 3/2001 | Rosenthal | 6,687,222 | B1 | 2/2004 | Albert et al. |
| 6,216,115 | B1 | 4/2001 | Barrameda et al. | 6,718,482 | B2 | 4/2004 | Sato et al. |
| 6,219,706 | B1 | 4/2001 | Fan | 6,718,535 | B1 | 4/2004 | Underwood |
| 6,222,914 | B1 | 4/2001 | McMullin | 6,725,269 | B1 | 4/2004 | Megiddo |
| 6,226,623 | B1 | 5/2001 | Schein et al. | 6,738,779 | B1 | 5/2004 | Shapira |
| 6,226,679 | B1 | 5/2001 | Gupta | 6,751,654 | B2 | 6/2004 | Massarani et al. |
| 6,227,447 | B1 | 5/2001 | Campisano | 6,754,833 | B1 | 6/2004 | Black et al. |
| 6,230,148 | B1 | 5/2001 | Pare et al. | 6,755,341 | B1 | 6/2004 | Wong et al. |
| 6,243,688 | B1 | 6/2001 | Kalina | 6,766,370 | B2 | 7/2004 | Glommen et al. |
| 6,243,816 | B1 | 6/2001 | Fang et al. | 6,772,146 | B2 | 8/2004 | Khemlani et al. |

| | | |
|---|---|---|
| 6,785,810 B1 | 8/2004 | Lirov et al. |
| 6,789,115 B1 | 9/2004 | Singer et al. |
| 6,805,288 B2 | 10/2004 | Routhenstein et al. |
| 6,810,395 B1 | 10/2004 | Bharat |
| 6,820,202 B1 | 11/2004 | Wheeler et al. |
| 6,832,202 B1 | 12/2004 | Schuyler et al. |
| 6,856,970 B1 | 2/2005 | Campbell et al. |
| 6,892,231 B2 | 5/2005 | Jager |
| 6,907,566 B1 | 6/2005 | McElfresh et al. |
| 6,925,481 B2 | 8/2005 | Singhal et al. |
| 6,983,421 B1 | 1/2006 | Lahti et al. |
| 7,020,696 B1 | 3/2006 | Perry et al. |
| 7,093,282 B2 * | 8/2006 | Hillhouse .................. 726/5 |
| 2001/0012974 A1 | 8/2001 | Mahaffey |
| 2001/0027474 A1 | 10/2001 | Nachman et al. |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0077978 A1 | 6/2002 | O'Leary et al. |
| 2002/0096570 A1 * | 7/2002 | Wong et al. .................. 235/494 |
| 2002/0099826 A1 | 7/2002 | Summers et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0152163 A1 | 10/2002 | Bezos et al. |
| 2002/0165949 A1 | 11/2002 | Na |
| 2002/0174010 A1 | 11/2002 | Rice, III |
| 2002/0184507 A1 | 12/2002 | Makower et al. |
| 2002/0188869 A1 | 12/2002 | Patrick |
| 2002/0191548 A1 | 12/2002 | Ylonen et al. |
| 2003/0018915 A1 | 1/2003 | Stoll |
| 2003/0023880 A1 | 1/2003 | Edward et al. |
| 2003/0028790 A1 * | 2/2003 | Bleumer et al. .............. 713/189 |
| 2003/0034388 A1 | 2/2003 | Routhenstein et al. |
| 2003/0037142 A1 | 2/2003 | Munger et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154403 A1 | 8/2003 | Keinsley et al. |
| 2003/0159072 A1 | 8/2003 | Bellinger et al. |
| 2003/0163733 A1 | 8/2003 | Barriga-Caceres et al. |
| 2003/0177067 A1 | 9/2003 | Cowell et al. |
| 2003/0191549 A1 | 10/2003 | Otsuka et al. |
| 2003/0233317 A1 * | 12/2003 | Judd ....................... 705/39 |
| 2004/0031856 A1 | 2/2004 | Atsmon et al. |
| 2004/0117409 A1 | 6/2004 | Scahill et al. |
| 2004/0199474 A1 | 10/2004 | Ritter |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0278641 A1 | 12/2005 | Mansour et al. |
| 2006/0106606 A1 * | 5/2006 | Labaton .................. 704/250 |
| 2009/0100508 A1 * | 4/2009 | Labaton .................. 726/5 |

FOREIGN PATENT DOCUMENTS

| | | |
|---|---|---|
| EP | 0590861 A2 | 4/1994 |
| EP | 0855659 A1 | 7/1998 |
| EP | 0884877 | 12/1998 |
| EP | 0917119 | 5/1999 |
| EP | 1022664 | 7/2000 |
| JP | H10-187467 | 7/1998 |
| JP | 2005-242976 | 9/2005 |
| WO | WO 97/43736 | 11/1997 |
| WO | WO 99/40507 A1 | 8/1999 |
| WO | WO 99/52051 | 10/1999 |
| WO | 00/51280 | 8/2000 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
Java, Banking on Java(TM) Technology, java.sun.com, May 21, 1999.
Bechtel Construction Operations Incorporated Standardizes on Primavera's Expedition Contract Management Software, Business Wire, Jul. 27, 1999.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep. 10, 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.

Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent. idg, p. 1 of 5, retrieved from the internet on Nov. 28, 2005.
Java, Java (TM) Technology in the Real World, java.sun.com, May 21, 1999.
Java, Java(TM) Remote Method Invocation (RMI) Interface, java.sun.com, May 32, 1999.
Java, Java(TM) Servlet API, java.sun.com, May 21, 1999.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After an Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers by Engineers, Thomas Publishing Company, Apr. 26, 1999.
Java, Staying in Touch with JNDI, java.sun.com, May 21, 1999.
Summary of the at Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
Java, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.

* cited by examiner

SYSTEM FOR PROVIDING CARDLESS PAYMENT

RELATED APPLICATIONS

This patent application is a Continuation of U.S. patent application Ser. No. 09/956,997, filed on Sep. 21, 2001 now U.S. Pat. No. 7,103,576 entitled "SYSTEM FOR PROVIDING CARDLESS PAYMENT", which is hereby incorporated by reference in its entirety.

This application is related to U.S. patent application Ser. No. 09/957,505, entitled "Method For Providing Cardless Payment" which is incorporated herein by reference in its entirety.

FIELD OF THE INVENTION

The system of the invention relates generally to performing transactions related to an account, so as to eliminate the need for the physical presence of a transaction card during the transaction.

BACKGROUND OF THE INVENTION

There are literally thousands of different credit cards, funds cards or other personal cards available which provide an account-holder with a variety of capabilities. Some provide frequent flier miles, others give a user free gas. Still other credit cards offer low interest rates and even insurance for purchases. Out of all the transaction cards that exist, none of them offer the ability to go to a store and make purchases, without the actual card, by utilizing convenient identifying information that is selected by the account-holder.

Further, conventional known techniques do not provide for conducting business over the Internet without using the transaction card number, for example, or some other mandated number. That is, the conventional techniques do not provide for an account-holder to select convenient identifying information by which to access and use that account-holder's account.

To explain, it is highly desirable to use easy to remember numbers or other information to effect transactions. Illustratively, while it is possible to place an order over the phone to a catalog company, it is burdensome to have a physical card in your hand to read the card number to the sales person and provide some additional information such as the expiration date. Perhaps a trivial number of people have memorized their transaction card number and expiration date, but most people have yet to commit these seldom used 20-digits, for example, to memory, i.e., the 20-digit number including a 16 digit card number and a four digit expiration date.

Additionally, those with an active lifestyle often find it burdensome to carry many cards with them during their everyday lives. The risk of losing one's wallet or purse, or having it stolen is an ongoing problem. The replacement process for most credit cards, a particular type of transaction card, for example, is long and burdensome. If a credit card is stolen and unauthorized charges are discovered on the account, the process to rectify the situation is both time consuming and exhausting, often involving sworn affidavits by the cardholder.

These drawbacks, as well as others, exist with current transaction cards and the techniques utilized in conjunction with such current transaction cards.

SUMMARY OF THE INVENTION

The disclosed method and system in accordance with embodiments of the invention provide a technique for allowing an account-holder to select an alias by which an account-holder may access and use a transaction account using convenient and/or easy to remember information. Further, the method and system in accordance with embodiments of the invention provide a technique for allowing an account-holder to select an alias, as well as a personal identification entry, by which an account-holder may access and use a transaction account using convenient and/or easy to remember information.

The present invention further provides a system and method for enabling an account-holder to use his or her transaction card or a transaction account without actually having a card present at the time of purchase. This is accomplished by cross-linking the account-holder's phone number, or other alias that is selected by the account-holder, to the transaction card number, such as a credit card number, and providing the customer with a corresponding "personal identification entry" (PIE) that can be changed immediately upon receipt so that it is a number that the account-holder can easily remember. It should be appreciated that a PIE may take the form of a conventional Personal Identification Number (PIN). The PIE can also be selected by the account-holder from his or her home phone. As one method of authentication, the bank can verify the identity of the caller by their phone number, if their phone number is chosen as the PIE, using an Automatic Number Identification ("ANI") system, which ensures a secure registration of the PIE. The customer can then self-select the PIE he or she wishes to use.

These and other aspects and advantages of the invention will be apparent from the detailed description of the exemplary embodiments which follow.

DETAILED DESCRIPTION OF THE PREFERRED EMBODIMENTS

Hereinafter, various embodiments of the method and system of the invention will be described. As used herein, a "transaction card" means a credit card, debit card, stored value card, smart card, or any other type of card, electronic account, or payment vehicle that is used by a person or an entity and that allows that person or entity to perform any of a wide variety of transactions, which relate to an account, i.e., a "transaction account," including electronically accessing funds, mutual funds, money market accounts, margin accounts, bank accounts, sweeps card accounts, a line of credit, stock information, electronically accessing information such as address information, or performing other transactions, for example.

Further, the transaction card may be used by any of a variety of users characterized herein as "account-holders." Accordingly, an "account-holder" may be any of a variety of persons or users having an account or accounts including, for example, a cardholder, i.e., a person who possesses a card of some type, but who does not need to physically carry the card with them as a result of the systems and methods of the invention.

Figure 1:
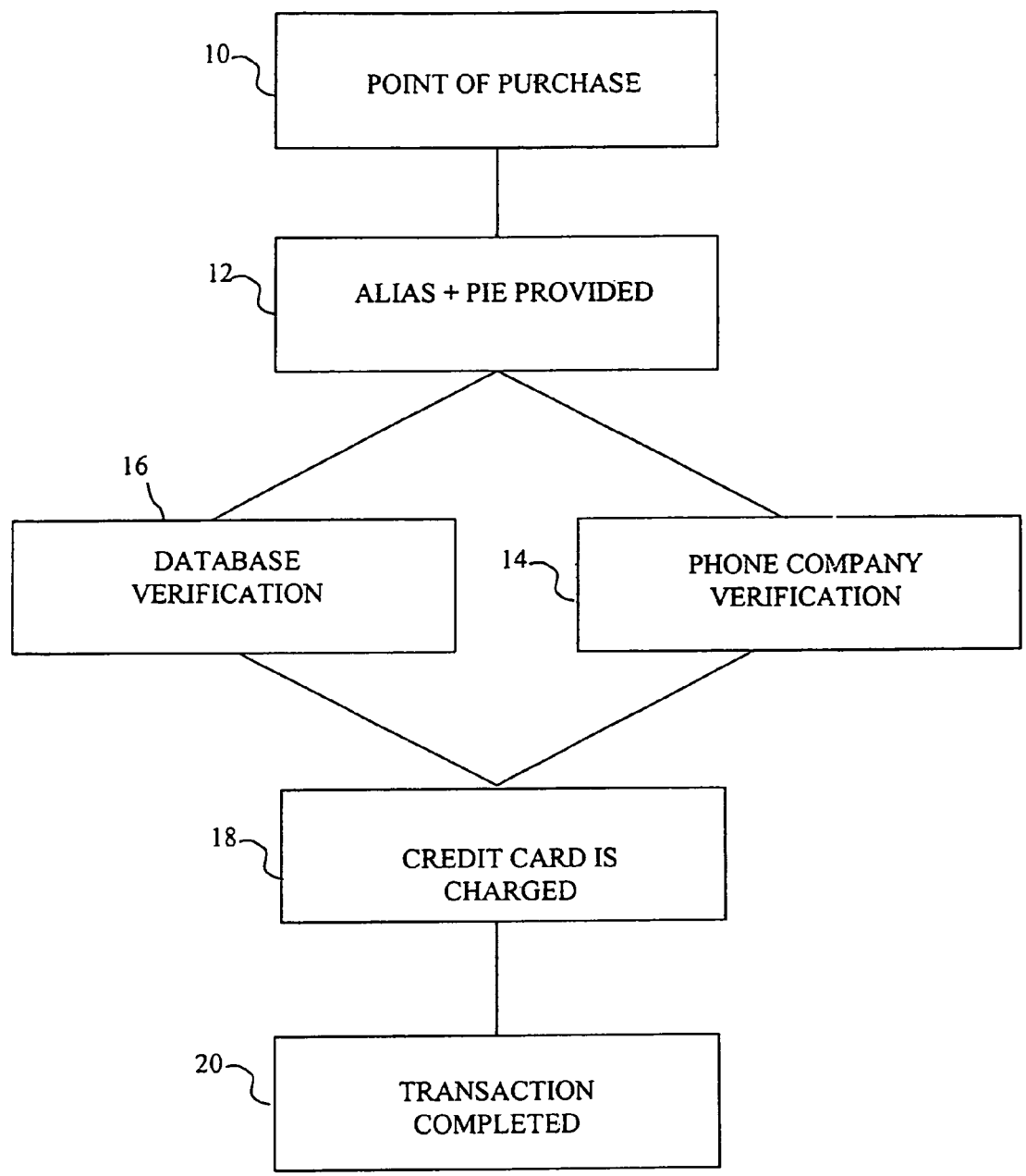
FIG. 1 is a flow chart showing a method of use according to one embodiment of the invention.

FIG. 1 shows one example of an account-holder transaction according to the method of the present invention. In FIG. 1, a credit card purchase is commenced at any given "point of purchase" location in step 10. A "point of purchase location" is any location where it is possible to make a purchase using a credit card. For example, any store that accepts credit cards would be a point of purchase location. Any telephone can be considered a point of purchase location since it is possible to telephone a company, such as a catalog company, and place a credit card order over the phone. Instead of providing the merchant with the credit card for payment, or in the case of a telephone order providing the card number and expiration date, the account-holder will enter a selected alias, such as the account-holder's ten-digit home telephone number, or alternatively a cellular-number or personal communications service (PCS) number, for example, and the selected PIE, such as a home telephone number, into a device similar to the credit card readers in use today in step 12.

This device will connect to a database, perhaps the database already maintained by the telephone company in step 14, and it will check for authenticity. Alternatively, the transaction card company may have their own database which includes all the appropriate information and can verify the account-holder and process the transaction with the appropriate card in step 16. The validation process should be fairly quick and will then retrieve the credit card linked to the alias and PIE the account-holder has provided. After validation has succeeded, the credit card will be charged and the merchant will receive notice of this validation in step 18. The account-holder must then sign some sort of receipt or authorization slip and the transaction is complete in step 20.

This entire process is very similar to current day credit card transactions with the exception that instead of providing a plastic card, the account-holder need only enter their selected alias number and selected PIE. In accordance with this embodiment of the method of the invention, a suitable "keypad" is used by customers so they can enter their alias and/or their PIE. Optimally, the arrangement of the keypad allows the customer to enter the required information discreetly. Alternatively, the customer can provide the alias and PIE directly to the merchant either verbally or in writing, for example.

Figure 2:
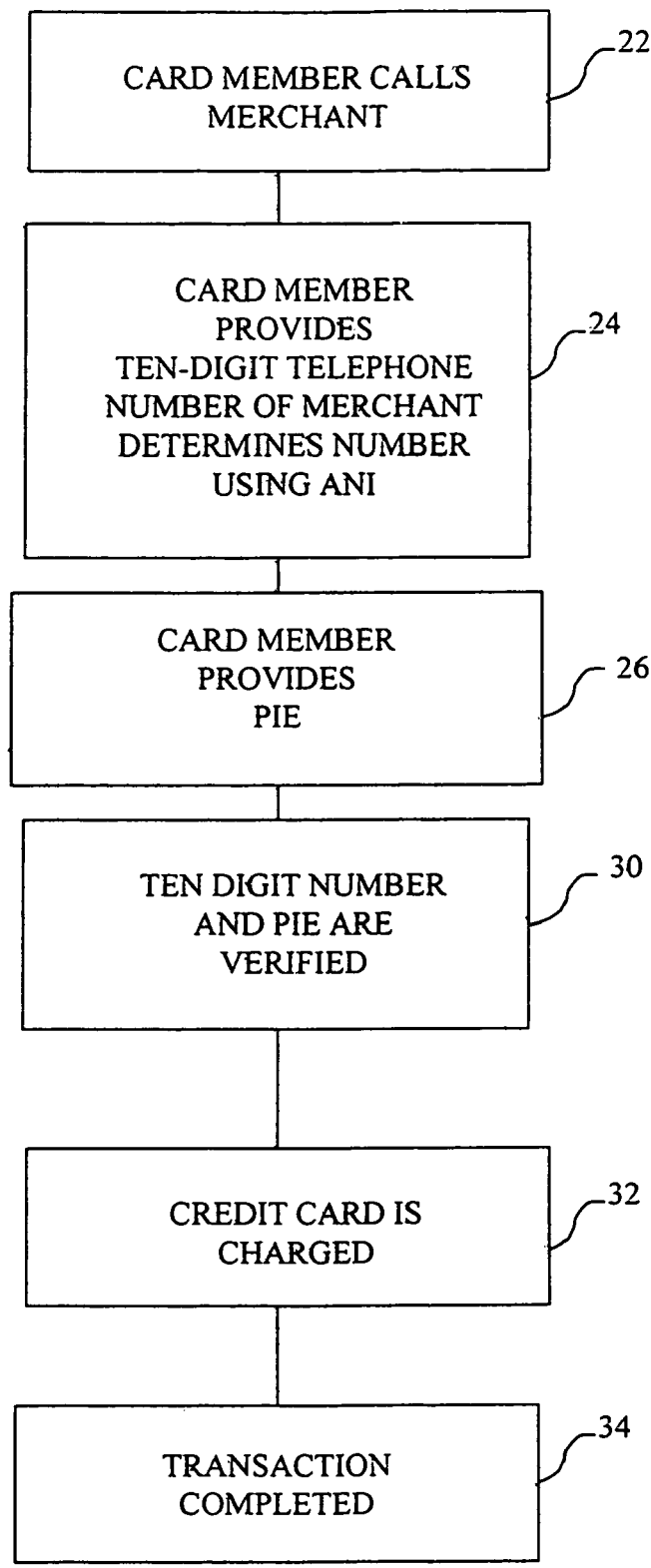
FIG. 2 is a flow chart showing a transaction according to one embodiment of the invention.

FIG. 2 shows a similar transaction between an account-holder and a merchant conducted over a telephone, or alternatively cellular phone or personal communications service (PCS), for example. In FIG. 2, an account-holder initiates a transaction by calling a merchant over the telephone in step 22. After identifying the item to be purchased, the account-holder authorizes his card to be charged by providing the representative with his alias, which in this case is his ten-digit telephone number. Alternatively, the merchant may use an ANI to determine the telephone number of the caller in step 24, i.e., if the caller has designated their home phone number as the alias. This is useful in situations where the account-holder is calling from their home and provides an added measure of security to make sure the authorized account-holder is the one placing the order.

The transaction is continued and the card number received by the merchant is verified using the account-holder's PIE. In step 26, the account-holder provides the PIE to the merchant. This can be done by having the account-holder punch in the PIE on the telephone key pad or verbally indicating the PIE to the merchant, for example. The ten-digit number, i.e., the alias, and PIE are verified by the merchant in step 30. The verification process is similar to that used to verify original credit card numbers and expiration dates. Once the number has been verified, the merchant processes the transaction and the credit card is charged in step 32. After the credit card has been charged, the transaction is completed in step 34.

Figure 3:
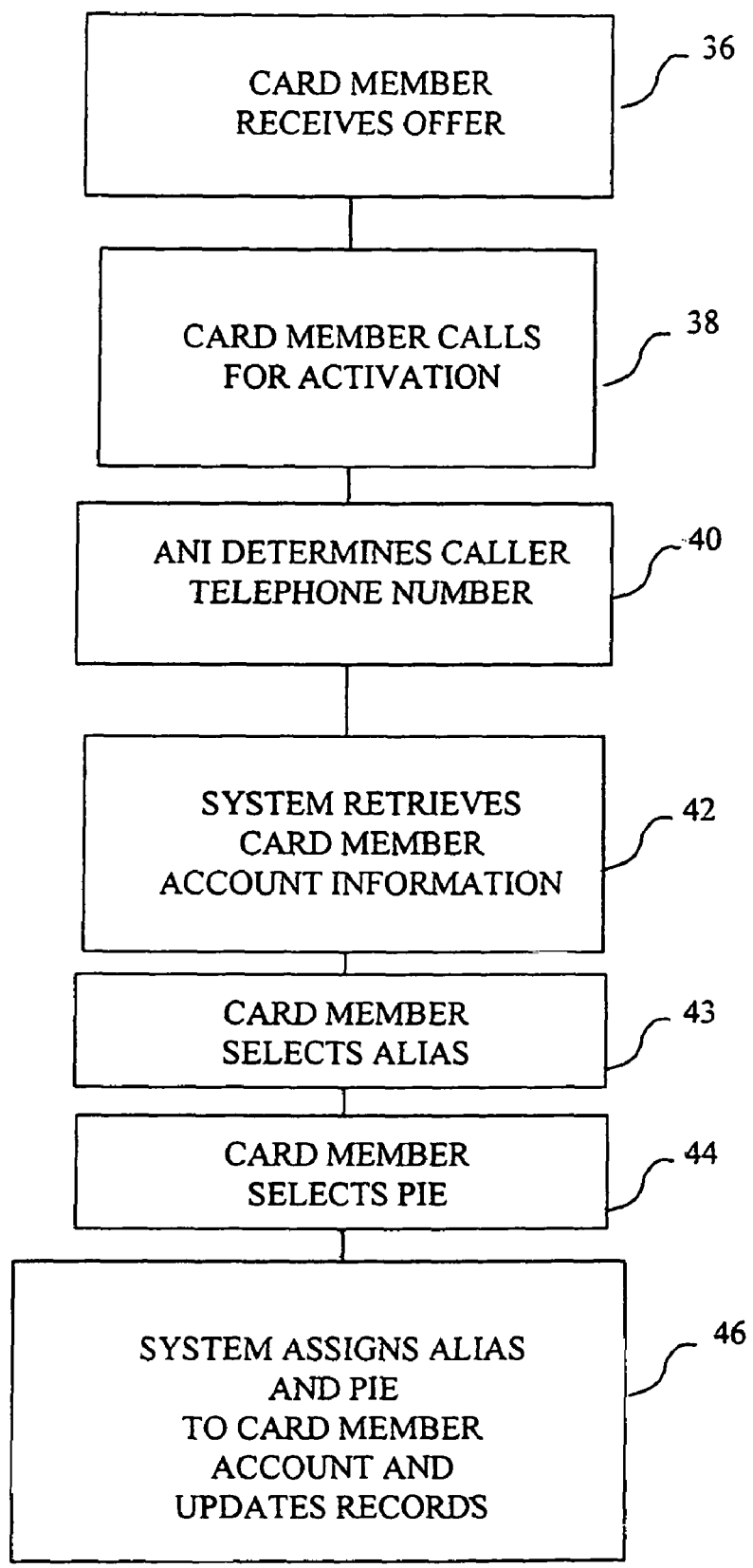
FIG. 3 is a flow chart showing acceptance of an offer and set up of an account according to one embodiment of the invention.

It should be appreciated that selecting an alias and selecting a PIE are relatively easy processes in accordance with embodiments of the method of the invention. FIG. 3 shows the activation and assignment process for a current account-holder. A current account-holder, in this case a card member, is a person that already has a credit card account with the credit card company and is merely calling to select their alias, as well as selecting a PIE. The process is initiated in step 36 when a current account-holder receives the offer from the credit card company to select an alias. This offer can be received by mail, e-mail, telephone, or any number of ways. If the offer was received by any manner other than a telephone call, the account-holder calls the credit card company for activation in step 38 in accordance with one embodiment of the method of the invention. When the call is received by the credit card company, the caller's telephone number is automatically identified by an ANI system in step 40.

By determining the telephone number of the caller, the credit card company can determine the caller's identity and account number. This can be done by asking the caller for his account number or, preferably, by having a system, such as a voice recognition unit (VRU), obtain the account number from the caller and automatically retrieve the account-holder's account information based on the telephone number as shown in step 42. In step 43, the card member selects an alias. Then, the process passes to step 44.

In step 44, the account-holder selects a PIE to be used with his telephone number alias. Alternatively, the credit card company can assign a PIE, as well as multiple PIEs or multiple aliases, randomly. The activation process is completed in step 46 when a credit card company assigns an alias and a PIE to the account-holder's account and updates the appropriate database record or records. This updating may of course be done automatically.

In accordance with further embodiments of the method of the invention, the activation process performed over the telephone can be totally automated as well. For example, a current account-holder would receive the offer in the mail including a telephone number for the account-holder to call for activation. The account-holder would then call the designated number. The credit card company could then automatically determine the account-holder's telephone number using an ANI and present the account-holder with a pre-recorded menu of options, such as by utilizing a voice recognition unit or system. By using these options the account-holder would be able to request selection of the alias and select a PIE using the telephone key pad. Registration is then completed by having the system automatically update the account-holder's account and records with the selected alias and the selected PIE.

Figure 4:
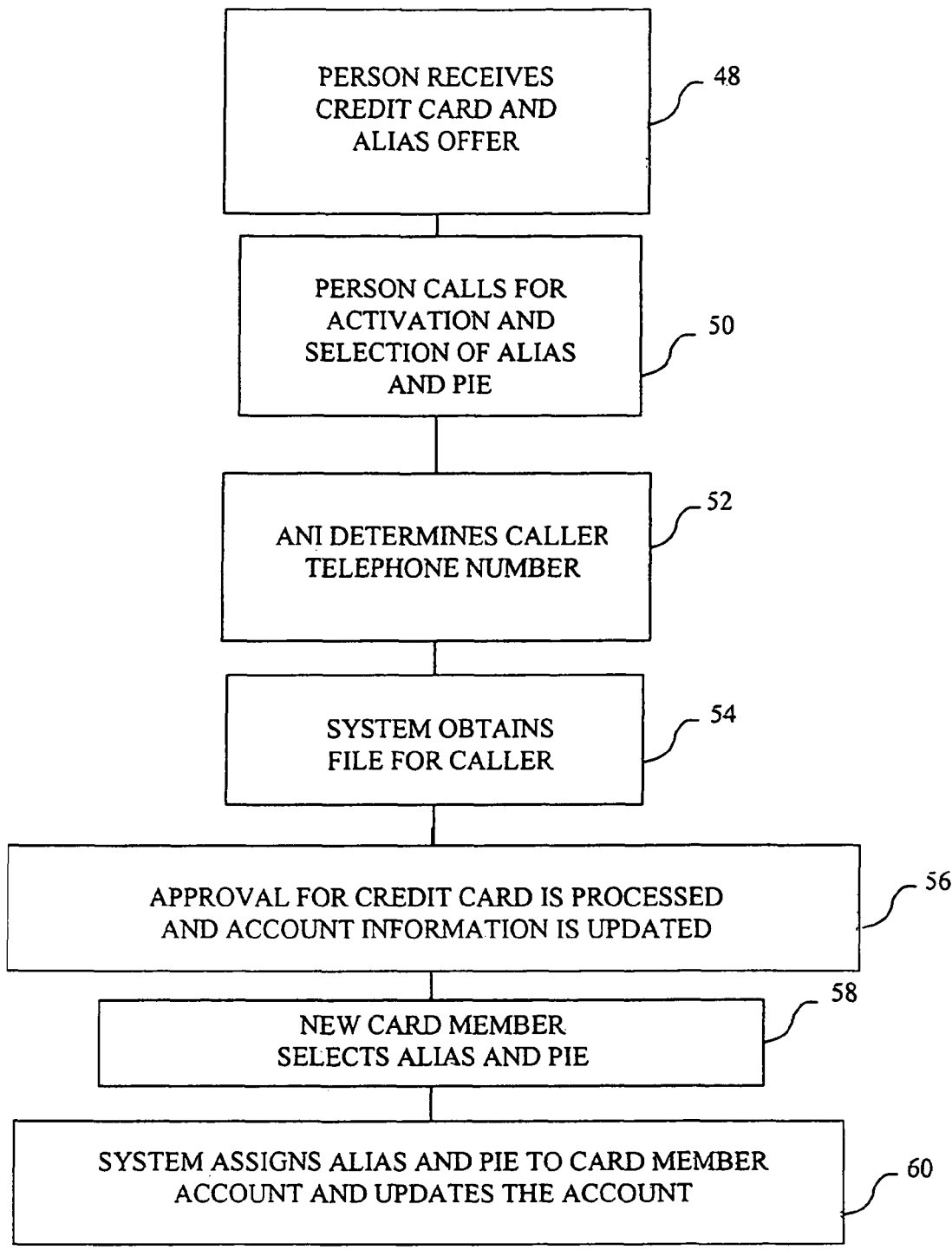
FIG. 4 is a flow chart showing acceptance of an offer and set up of an account according to one embodiment of the present invention.

The activation and registration process can also be utilized by a new account-holder. As shown in FIG. 4, a new member would receive a credit card offer with an option to select an alias for the new account in step 48. The person can accept this offer and apply for the credit card and alias by calling a designated number for activation in step 50. In step 52, the credit card company can use an ANI to determine the caller's telephone number for verification. Alternatively, a customer service representative can verbally obtain the information from the account-holder. In step 54, the system would receive a file containing the caller's financial information and pre-approval status. This information can be used by a customer service representative, or by the system automatically, to activate a new account for the caller. Preferably, a customer service representative would obtain additional financial information and confirm existing information thus providing the credit card company with a more thorough screening process.

Approval for the new account can then be processed in step 56 and any updating can also be performed as well. At this time, the account-holder can select an alias and a PIE as shown in step 58. The registration and activation process is completed in step 60 when the system assigns the alias and the PIE to the account-holder's account and updates the account accordingly. At this point, the system can activate the account or hold it pending approval of subsequent credit checks as may be desired.

Consumers who have a plurality of transaction cards have the option of selecting multiple PIEs, each of which would correspond to a different transaction card, but be used with the same alias, in accordance with some embodiments of the invention. When making a purchase, the account-holder need only provide the selected alias and the PIE corresponding to the card he or she wishes to charge the purchase on.

Security measures for the cardless payment system, in accordance with embodiments of the method of the invention, will be nearly the same as those used by credit cards. Credit cards themselves are not a secure system by definition. If a card is lost or stolen, misuse of the credit card is quite possible. The same systems used to handle fraud for credit cards may be used to handle the present invention. No new security issues exist with the cardless payment system, in accordance with embodiments of the method of the invention, beyond the current ones faced by credit cards today. In fact, perhaps even less security issues exist with the cardless payment system of the invention due to the fact that no transaction card is being carried around by the account-holder and thus the chances of having the transaction card lost or stolen is significantly reduced. If the account-holder decides to destroy the plastic card and rely solely on the cardless payment system of the invention, providing the capability to select an alias and a PIE, then the chances of the card being lost or stolen are practically zero.

The registration process for the cardless payment system, in accordance with embodiments of the method of the invention, is also unique. By allowing an account-holder to choose the account-holder's alias and PIE, the systems and methods of the invention provide convenience and ease-of-mind to the account-holder. That is, the account-holder may choose both an alias and a personal identification entry (PIE) that is easiest for him or her to remember, or alternatively, that is more closely tailored to the particular's account-holder's needs. For example, an account-holder may desire additional security than is normal. As a result, the account-holder might not use her home phone number as the alias, but rather some more obscure number.

Additionally, in accordance with further embodiments of the invention, once consumers have entered their alias, they can select multiple payment methods. For example, if an account-holder has two different credit cards and a debit card, with the same or multiple issuers, after entering their ten-digit alias number and PIE they can choose which card to use for payment through some sort of self-selection menu. Alternatively, a single account-holder may have multiple PIEs representing different credit cards. In accordance with embodiments of the method of the invention, it is possible to assign one PIE to their Visa card and another PIE to their Master-Card, both on the same alias, i.e., the same phone number, for example.

It should be appreciated that uses of the method of the invention include, but are not limited to, any "point of sale" where there is a suitable terminal at which point consumers can enter in a number. The invention is also applicable to card not present situations including ordering a product by telephone or over the Internet, for example. The systems and methods of the invention allow the consumer to buy something without giving their credit card information over the phone. That is, if the consumer's home phone number is selected as the alias, all that the consumer needs to do is enter the PIE, since the phone number is automatically detected over the phone by the merchant. This is added security since many people still do not like disclosing credit card numbers over the phone.

As described above, communication over the telephone may be utilized to select an account-holder's alias, as well as to select a PIE. However, it should be appreciated that the system and method of the invention is not limited to the telephone. An offer to select an alias may be e-mailed from the credit-card company to the account-holder or performed using a suitable web page or other world wide web technology, for example. If using e-mail, once the e-mail is received, the account-holder may then select the alias over the Internet via e-mail, as well as select a PIE. It should also be appreciated that other suitable forms of communication over the Internet, or other network, may also be utilized in implementation of the method of the invention other than e-mail.

As a further alternative to selection of the alias and selection of a PIE over the telephone, the account-holder might physically go to an office of the transaction card company, for example. At the transaction card company office, the alias could be selected and the PIE selected through human interaction. In accordance with further embodiments of the method of the invention, an account-holder might utilize an automated machine for selection of the alias and selection of a PIE, or alternatively to change the alias or PIE. Such automated machines may be strategically geographically positioned in a manner similar to automated teller machines (ATM). Further, the processing and communications capabilities required to perform alias selection and PIE selection, as well as use, may be combined with the technology utilized in conventional ATMs, i.e., combined within the same physical machine.

Further, it should be appreciated that selection of an alias and a personal identification entry may not involve simply the selection of alphanumerics. That is, an account-holder may choose to select an alternative type of alias or personal identification entry. For example, such alternative types may include fingerprint recognition, gene identification, DNA identification, use of biometrics, i.e., using biological parameters of a person, retina identification, or voice recognition, for example.

As described above, an account-holder selects a PIE that is used in conjunction with the alias for a particular transaction card, for example. However, in accordance with further embodiments of the system and method of the invention, one alias may be used with multiple PIEs for one transaction card. To explain, an account-holder might rotate through three different PIEs. That is, the account-holder would make a first purchase in the morning using her first PIE. Thereafter, the account-holder might make two additional purchases in the afternoon using her second and third PIE, respectively. Then, in the evening when making a fourth purchase of the day, the account-holder would again use her first PIE. Using this method, the account-holder must keep track of which PIE the account-holder is currently on, i.e., what PIE in the rotation the account-holder should use next. It should of course be appreciated that any number of PIEs might be utilized in the rotation.

As the number of PIEs increases, the complexity of keeping track of which PIE to use will of course increase. Accordingly, it should be appreciated that the complexity of the transaction may be justified based on the desired level of security. In contrast, the complexity of keeping track of which PIE to use may not be justified by the required level of security, thus resulting in the potential for unnecessary confusion to the account-holder.

As described above, when using multiple PIEs, the account-holder must keep track of which PIE the account-holder is currently on. This may be problematic since, for example, long periods of time may pass between uses of a particular card. To provide assistance to the account-holder in remembering their current place in the PIE rotation, a prompt may be provided to the account-holder during a transaction. For example, the prompt may be displayed subsequent to the account-holder entering their alias. The prompt might be in the form of "Currently on PIE rotation 2." The account-holder would then remember the PIE that corresponds with that particular rotation number. Alternatively, the prompt might say "currently on PIE 2," so as to provide the useful feedback to the account-holder.

Other feedback might also be provided in accordance with embodiments of the method of the invention. As described above, a single account-holder may have multiple PIEs representing different credit cards, from the same or different issuers. That is, it is possible to assign one PIE to their VISA card and another PIE to their MasterCard, both on the same alias. Subsequent to performing a transaction using the account-holder's alias and a particular PIE, feedback may be provided to the account-holder indicating which account was debited, for example. For example, the feedback may be in the form of "VISA debited using PIE '8049," wherein 8049 is the last four digits of the account-holder's PIE number. It should of course be appreciated that other useful feedback information may be provided as is necessary or desired. This information may be printed on an account-holder's receipt, for example, or otherwise conveyed to the account-holder. The information might be in the form of a short text message. Accordingly, the account-holder would be advised of the authentication and verification of the transaction, and the source from which the funds were debited, for example.

The use of the above PIE rotation process provides an additional level of security to the account-holder. For example, another customer behind the account-holder might note the PIE number entered by the account-holder into a keypad at a grocery store. Further, the additional customer might have heard, or be able to otherwise obtain the alias used by the account-holder, in particular if the alias is the account-holder's telephone number. However, when the additional customer attempts to use this information to perform a fraudulent transaction, the additional customer's chances of success will be substantially limited, depending on where the account-holder is in the PIE rotation.

In various embodiments described above, the system and method of the invention are utilized in the context of using a credit card. However, it should be appreciated that the invention is not limited to use with a credit card. Any of a variety of other transaction cards might also benefit from use of the alias and PIE described herein. Accordingly, stored value cards or debit cards, for example, might be used in conjunction with the methods of the invention.

In accordance with some embodiments of the method of the invention, it should be appreciated that multiple PIEs might be used to control from which card requested funds are obtained. To explain, an account-holder might possess a credit card, a debit card and a stored value card. Further, that account-holder may always prefer to use his credit card, but of course only if there is available credit thereon. Accordingly, the particular PIE utilized by the account-holder may control the hierarchical ranking of which card is accessed first, second, third, and so forth. In other words, one of a plurality of possible PIEs, which is entered by the account-holder, may determine the hierarchical ranking of which of the plurality of possible funds accounts is accessed for withdrawal of funds.

For example, a PIE "BG123" might access the credit card, debit card, and stored value card in order, obtaining the requested funds from the first card that is able to grant the request. A different PIE may be utilized to change the hierarchical order. That is, the PIE "BG231" might be used for the hierarchical order of looking first to the debit card, then to the credit card, and lastly, to the stored value card in order to obtain requested funds.

As described above, the alias and PIE may utilize numbers, such as for example a telephone number. However, the method of the invention is not limited to use of numbers. That is, any of numbers, alphanumerics, names, phrases, or combinations of numbers, alphanumerics, names or phrases, for example, might be utilized for either the alias or the PIE. Also, alternative techniques of identification might be utilized for either the alias or the PIE, such as human characteristics. These further forms of identification might include fingerprint recognition, gene identification, DNA identification, use of biometrics, i.e., using biological parameters of a person, retina identification, or voice recognition, for example.

As described above, the person's phone number, for example, might be used as a PIE. Illustratively, if a transaction is done over the telephone, the caller's phone number might be determined using an ANI system. This allows the caller's PIE to be immediately obtained and stored. Once the caller provides his alias, and the association is made with the corresponding account of the caller using the alias, the PIE may then be retrieved from memory for authentication or authorization of the desired transaction.

In accordance with further embodiments of the method of the invention, a person's signature might also be utilized as either the alias or the PIE. To further explain in the context of utilizing a signature as a PIE, a customer would initially be prompted to enter their alias, for example, their telephone number. Thereafter, the customer would be prompted to sign their name utilizing a digital signature pad. That is, the digital signature pad captures the signature digitally and stores the signature information in what might be characterized as a "new signature data file." The information in the new signature data file is then compared with an authorized signature, which is maintained at a central processing center of the bank or other entity, for example. That is, the new signature data file is compared with an authorized signature data file to determine the level of similarities. The comparison may be performed by comparing the data points of the new signature, i.e., an executed signature, with the data points of the authorized signature. That is, the new signature might be mapped on to the authorized signature. If the similarity of the new signature and the authorized signature achieves a predetermined threshold, then the new signature is approved. It should be appreciated that the predetermined threshold may be determined based on a variety of parameters including weighing concern over potential fraudulent transactions against chronic problems of an authorized customer's signature not being accepted.

As described above, an account-holder uses an alias and a PIE, or alternatively, multiple PIEs. In accordance with one embodiment of the method of the invention, the account-holder routinely changes, i.e., updates, his or her PIE. This updating of the PIE might be performed using the telephone, over the Internet, through a sales representative at an office, by mail, or using an automated machine located at a convenient location, for example.

In accordance with this embodiment, a user selects an initial alias and PIE during activation. Also at activation, the account-holder selects the option of routinely changing her PIE number. As a result, after five transactions, for example, using the alias and first PIE, such first PIE then becomes invalid. As a result, the account-holder must contact the credit card company or other entity in order to obtain a new, i.e., a refreshed, PIE. Once this new PIE is obtained by the account-holder, then the account-holder uses this second PIE for the next five transactions. Thereafter, the second PIE becomes invalid. Such periodic changing of the PIE based on the number of transactions provides an added level of security, which may be preferred to some account-holders, balanced against the inconvenience of renewing the PIE. It should be appreciated that rather than every five transactions, any suitable number of transactions might be utilized prior to a particular PIE becoming invalid. Upon activation, for example, the account-holder might choose how many transactions may be performed prior to a particular PIE becoming invalid.

It should be appreciated that rather than the number of transactions determining when a particular PIE becomes invalid, other operating parameters may alternatively be utilized. For example, at the end of every month, or at some other predetermined time in each month or year, an account-holder might be required to renew her PIE.

It should be appreciated that in accordance with some embodiments of the method of the invention, a personal digital assistant (PDA) might be utilized. Illustratively, a customer wishing to check out of a store with her purchases may initially enter the alias into her PDA. In turn, the PDA communicates the alias information to the processing system of the cashier. This communication may be performed utilizing suitable communication technology, such as infrared technology. Upon receiving the alias, the cashier's processing system then prompts the customer for the customer's PIE. This prompting may be performed in any suitable manner. The customer may then enter the PIE into her PDA, which is then communicated to the cashier's processing system. It should be appreciated that such an arrangement may serve to limit the hardware requirements, for example, of the cashier by not requiring a keypad.

Once the alias and PIE are transferred to the cashier's processing system, authorization of the transaction is performed. Once the authorization is complete, the cashier's processing system may again communicate with the customer's PDA to transmit a digital receipt to the PDA. Accordingly, a paperless transaction is effected. It should be appreciated that in the context of this example, a PDA is utilized. However, this embodiment of the method of the invention might utilize any handheld computer or other processing system, which is capable of the processing as described above. That is, handheld computers or other processing systems, which are not characterized as "personal digital assistants" might also be utilized in conjunction with this embodiment of the invention.

As described above, a telephone number might be conveniently used as a PIE or as the alias. However, one possible shortcoming of utilizing a telephone number is that the telephone number is easily obtained by other persons. As a result, it may be preferable to use alternatives to a person's telephone number including numbers, alphabetical letters, alphanumerics, phrases, or combinations of such items as may be desired. In accordance with further embodiments of the system and method of the invention, various other operating parameters might be utilized as the alias and/or the PIE. For example, when performing an on-line transaction, the user identification parameters of an account-holder's computer, which may be obtained by the credit card company upon login may be used. Accordingly, an account-holder's user log-on information, for example, may be utilized in a manner similar to use of an automatic number identification (ANI) system, as described above. Further, such user identification based on the user identification parameters of an account-holder's computer may be utilized as a level of security in addition, rather than in substitution, of an alias and/or a PIE.

In accordance with further embodiments of the method of the invention, the alias and/or the PIE may include both static portions as well as dynamic portions, i.e., changing portions. Illustratively, the first ten digits of an account-holder's alias may be the account-holder's telephone number. However, the last two digits change. The change of the last two digits adds a further level of security. It should be appreciated, this further level of security may also add complexity to the transaction, which may not be desired or necessary.

In further explanation of the dynamic portion, the dynamic portion may be dependent upon the time of day, the month, or the geographic area in which the customer is effecting the purchase, for example. If dependent upon the time of day, the customer might enter her phone number as the first ten digits of the alias and "02" as the last two digits of the alias, assuming that the time is in the 2 o'clock hour, i.e., 2:45 p.m., for example. It should of course be appreciated that the dynamic portion of the alias and/or the PIE may be dependent upon a wide variety of parameters as is necessary or desired.

In accordance with a further embodiment of the method of the invention, an account-holder may routinely use a particular alias and PIE, but in addition possess specialty PIEs. In accordance with this embodiment, the specialty PIEs are entered in lieu of the routine PIE to effect certain predetermined options. For example, a specialty PIE might be utilized to deactivate the account-holder's debit card permanently, or alternatively, for a predetermined time. This might be particularly useful in the situation where one misplaces her debit card but then finds the debit card two days later. Other specialty PIEs might be utilized to provide a variety of options. For example, a specialty PIE might be utilized to adjust the available balance on the credit card utilized by a teenager under a parent's supervision. Thus, using a suitable account-holder interface, the account-holder would enter the alias and specialty PIE number. Thereafter, the user interface would prompt the parent account-holder to enter the desired credit limit.

In accordance with some of the exemplary embodiments described above, processing to effect authorization was performed upon the entry of the alias and PIE. However, it should be appreciated that the method of the invention is not limited to such immediate processing. That is, a merchant operating in the setting of a fair, for example, may not have capabilities to communicate with a particular account-holder's banking institution. As a result, the merchant may accept the alias and PIE from a customer and perform the processing of the alias and PIE at some later time, i.e., at the end of the day. Such business operation is of course dependent upon the merchant's risk assessment, i.e., weighing the desire to make the sale against the possibility of a fraudulent purchase.

Hereinafter, further considerations relating to use of multiple PIEs will be described. As described above, an account-holder may rotate through different PIEs for added security. Also, the account-holder may be prompted for a particular PIE, i.e., depending on where that account-holder is in the rotation of the PIEs. However, it should be appreciated that considerations must be taken into account when utilizing multiple PIEs in conjunction with batch techniques of processing. For example, the above described merchant operating in the setting of a fair may well utilize batch type processing at the end of the day to submit acquired alias and PIE numbers. Also, merchants in other situations may well utilize batch techniques. Thus, an "out of sequence" situation may arise from such batch processing. For example, the account-holder may have provided their alias and appropriate PIE number, based on the rotation status, but that PIE has not yet been processed. As a result, if the account-holder attempts a second transaction of the day, the account-holder may be prompted yet again for the same PIE. This can cause problems with verification and authorization of such an out of sequence transaction.

In accordance with one embodiment of the method of the invention, the above out of sequence problem is addressed by accepting any PIE number coming from certain vendors on a particular day. That is, the generally required order sequence of the PIE will be disregarded.

Alternatively, the verification and authorization of the transaction may consider both the PIE number, as well as the time of the transaction. That is, each transaction is time-stamped. Thus, the time of each sequential transaction would progress in a manner corresponding with the particular PIE utilized.

Further, a set of rules may be established to address specific situations. For example, a rule might indicate that if an alias and PIE are submitted utilizing batch processing techniques and no time of the transaction is provided, then that transaction will be authorized so long as the alias and PIE successfully fill a "slot" of the day. To explain, assume that PIE number 1 was used at: one o'clock, PIE number 3 was used at three o'clock, and PIE number 1 was again used at five o'clock. Also assume that an untimed transaction was also submitted in that same day, and that the untimed transaction was done using the number 2 PIE. Then, in this case, the activities of the day match with the untimed PIE.

As described above and in accordance with one embodiment of the method of the invention, it should be appreciated that an account-holder may utilize the PIE and alias of the invention in a first transaction of the day and later perform a transaction using the same card in the conventional manner, i.e., utilizing the magnetic strip of the card followed by the common signature. As should be appreciated, use of the alias and PIE may be highly desirable in some transactions. As a result, the issuing bank of the card may impose a fee for this added convenience. The fee may be triggered by any suitable processing step such as authorization of an alias and PIE. Further, suitable fees may be imposed based on various other parameters as is necessary or desired.

Figure 5:
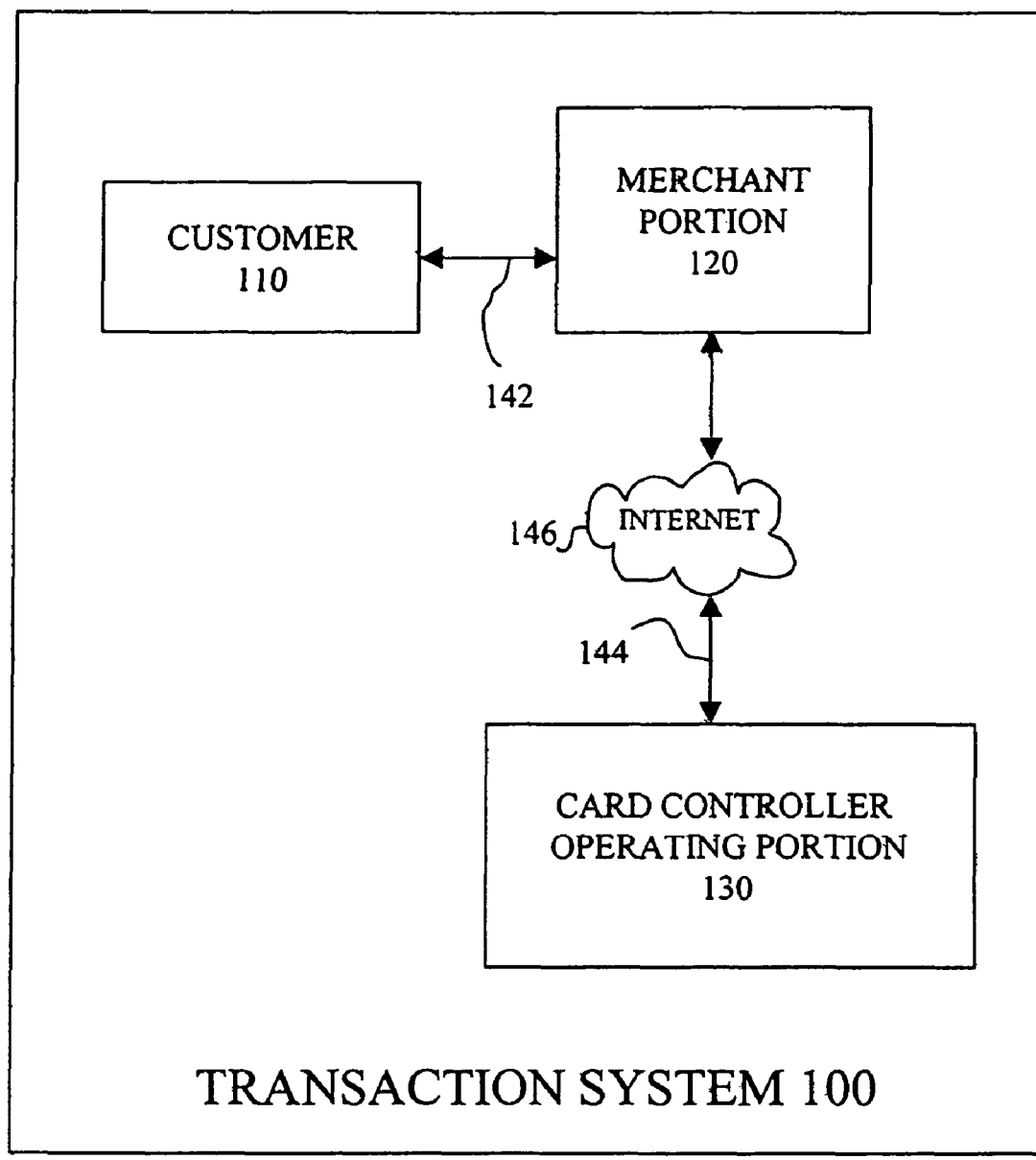
FIG. 5 is a block diagram showing a transaction system according to one embodiment of the present invention.

In further explanation of the system and method of the invention, FIG. 5 illustrates an exemplary transaction system 100, which utilizes the method of the invention. As shown in FIG. 5, the transaction system 100 includes a customer 10, a merchant portion 120 and a card controller operating portion 130.

The customer 110, the merchant portion 120 and the card controller operating portion 130 perform a variety of activities utilizing the processes of the invention described above. That is, the customer 110 interacts with the merchant portion 120 utilizing a communication interface 142. The communication interface 142 may be in the form of a network or over the Internet, for example. Alternatively, it should be appreciated, the communication interface 142 may simply be in the form of verbal communication between the customer 110 and the merchant portion 120.

The customer 110 and the merchant portion 120 interact utilizing the processes of the invention as described above. Accordingly, during the course of a transaction, the customer 110 provides both an alias and PIE to the merchant portion 120. In response, and at predetermined times during the transaction, the merchant portion 120 may communicate with the card controller operating portion 130. The communication between the merchant portion 120 and the card controller operating portion 130 may utilize a suitable communication interface 144 such as a network or the Internet 146, as shown in FIG. 5. The merchant portion 120 may also be characterized as an "interface portion" in that it interfaces with the customer.

Figure 6:
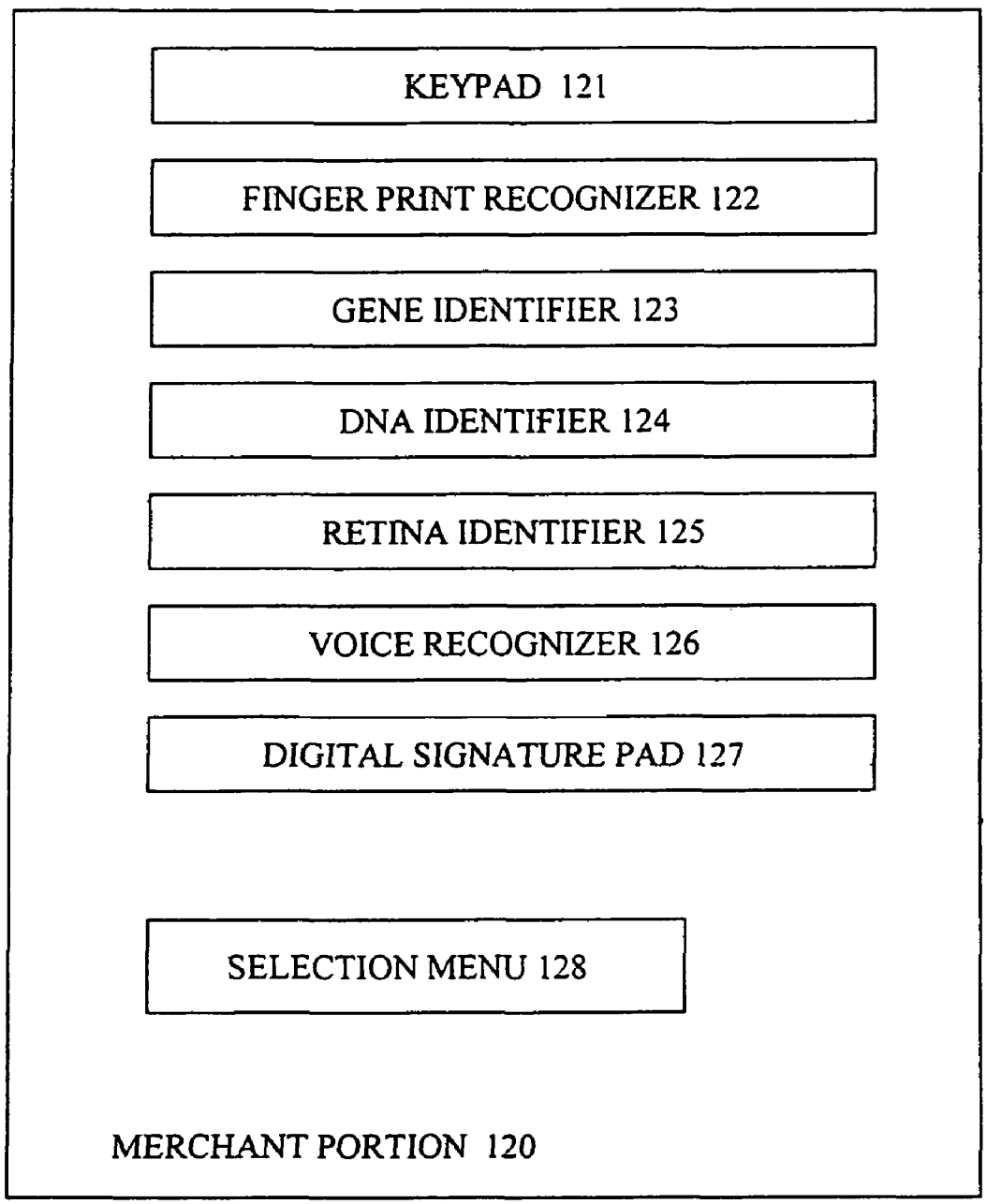
FIG. 6 is a block diagram showing the merchant portion of FIG. 5 in further detail according to one embodiment of the present invention.

FIG. 6 is a block diagram showing further details of the merchant portion in accordance with embodiments of the methods and systems of the invention. Specifically, FIG. 6 shows the various components a merchant may utilize by which an account-holder may enter an alias or a PIE. That is, the merchant portion 120 of FIG. 6 includes a keypad 121, a finger print recognizer 122, a gene identifier 123, a DNA identifier 124, a retina identifier 125 and a voice recognizer 126. The merchant portion 120 may use one of such components or more than one, as is desired, to identify either the alias or the personal identification entry (PIE).

The merchant portion 120 may also include a digital signature pad, by which a customer's signature may be digitally obtained, as is described above. The merchant portion 120 may also include a selection menu 128. The selection menu 128 allows a user to enter various selections, as described above, such as which payment method might be utilized, for example.

Figure 7:
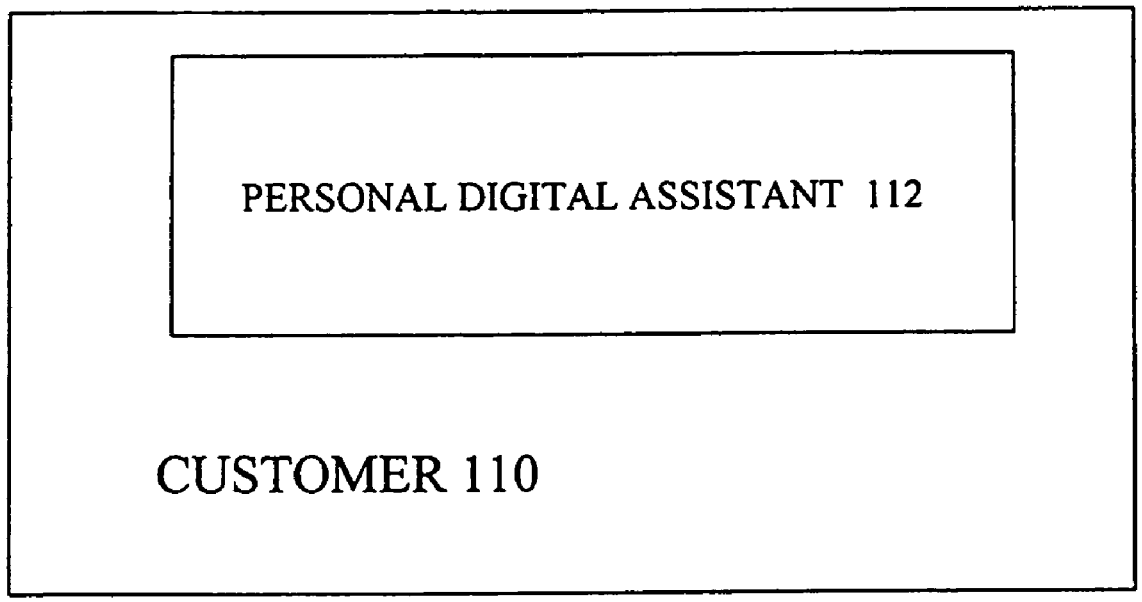
FIG. 7 is a block diagram showing the customer portion of FIG. 5 in further detail according to one embodiment of the present invention.

Further, FIG. 7 is a block diagram showing further details of the customer 110 in accordance with one embodiment of the methods and systems of the invention. Specifically, the customer 110 may include a personal digital assistant (PDA) 112. The PDA may be utilized in conjunction with a cashier, for example, as described above.

As described above, the invention is discussed in the context of a purchasing individual interacting with a business entity. However, the method of the invention is not limited to such interaction. Specifically, the alias and PIE technique of the invention may also be utilized in conjunction with other transactions, such as business to business interactions, for example.

In accordance with further aspects of the invention, the methods of using an alias and PIE of the invention may also be applied to a situation where two or more approvals need to be provided prior to granting a transaction. This might apply to a transaction of a more substantial nature, for example. For instance, a major purchase by a company might require two approvals, or alternatively, a parent approving a major purchase of a teenager, for example. In these situations, multiple approvals are needed to execute the transaction. In other words, the account-holder may be thought of as being two persons.

In accordance with one embodiment of the invention, such multiple approvals may utilize what might be characterized as a "partial PIEs," or alternatively, the multiple approvals might be characterized as "double PIEs." To explain, the partial PIEs are submitted together but probably at different times, so as to form a complete PIE. The partial PIEs include a first partial PIE and a second partial PIE, for example. The first partial PIE may be received and stored. Thereafter, in order to effect the transaction, the second partial PIE is required. Alternatively, the second partial PIE might be received first and then the first partial PIE, i.e., the order of the receipt of the first and second partial PIEs does not matter.

However, in accordance with one embodiment of the invention, there is a time limit placed on how much time can pass between receipt of the two partial PIEs. For example, when a first person submits her partial PIE, i.e., the first of two needed partial PIEs, she can specify the time limit or expiration period. To explain further, the elapsed time period between accepting entry of the first partial PIE and accepting entry of the second partial PIE is determined. If the elapsed time period is greater than a predetermined time period, for example the time period set by the first person, then the second partial personal identification entry is nulled, i.e., is made invalid. As a result, the transaction will not be authenticated nor performed.

Illustratively, college tuition is due for $5000. A father tells his son that he will pay for the tuition. The father calls in the alias, for the account from which the funds will be taken, and the father's partial PIE. The father provides an expiration date of five days. Subsequently, the son goes through the college finance department and sets up his courses. The son determines that the courses cost $4200 and, after four days, submits this amount using the alias of his father, or some other password, as well as the son's partial PIE. The transaction has both partial PIEs and is authorized accordingly.

In accordance with embodiments of the method of the invention as described above, a customer or business entity, for example, utilizes an alias and PIE to perform a transaction. The processing of the transactions as described above commonly may include transmission of data, including confidential information, over the Internet or other network. It should be appreciated that known techniques may be utilized in conjunction with the method of the invention. For example, conventional encryption techniques may be utilized to protect the confidentiality of data during transmission.

Figure 8:
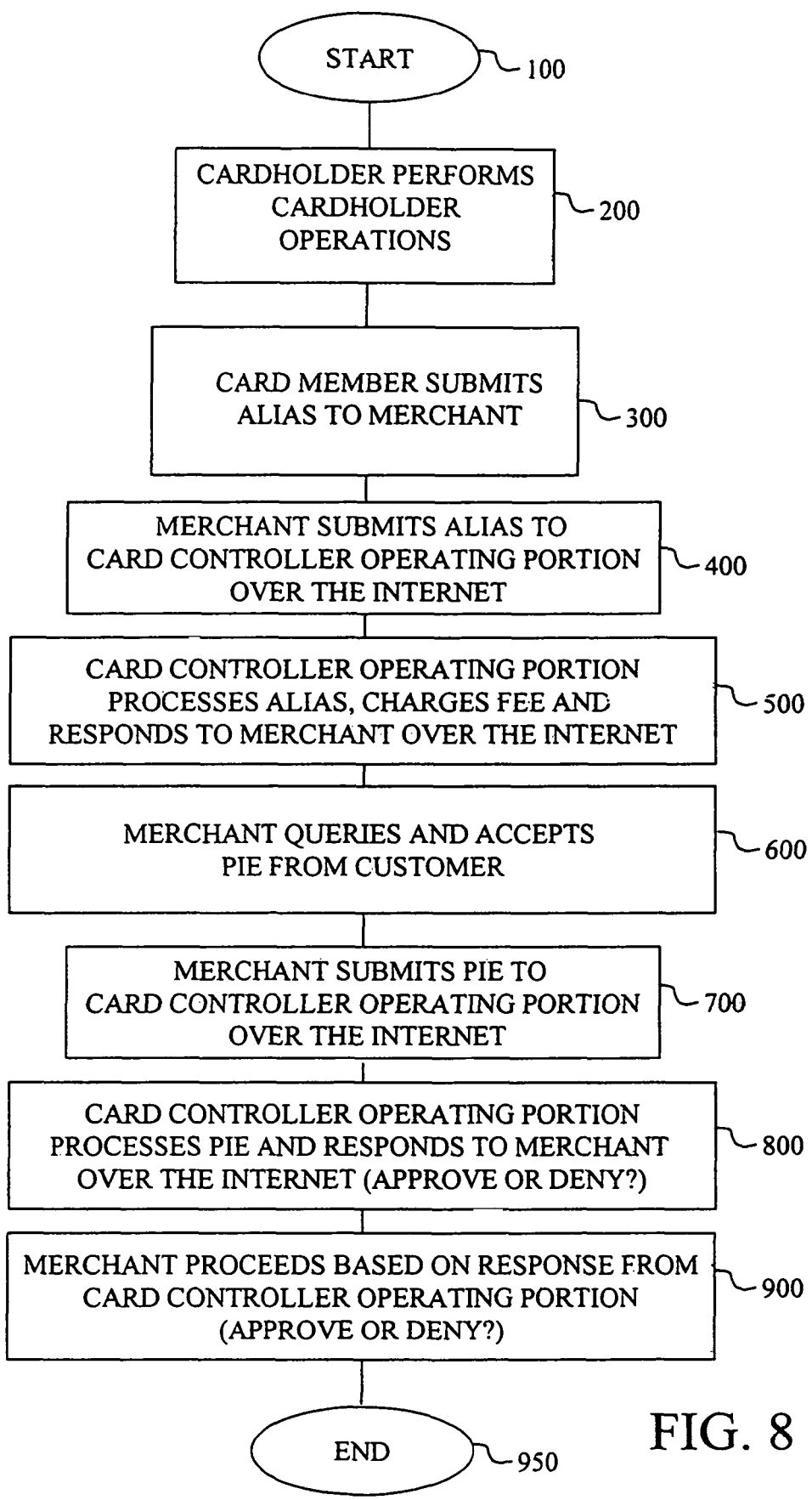
FIG. 8 is a flow chart showing a method of use according to a further embodiment of the invention.

FIG. 8 is a flowchart showing further aspects of the invention in accordance with one embodiment of the methods of the invention. It should be appreciated that the process of FIG. 8, as well as FIGS. 9-11 may be performed using the system of FIGS. 5-7, or another suitable system.

As shown in FIG. 8, the process starts with step 100. Then, the process passes to step 200. In step 200 the account-holder performs account-holder operations, which are described in further detail below. Then, in step 300, the card member submits an alias to a merchant. In step 400 the merchant submits the alias to a card controller operating portion over the Internet, or some other communications network, for example. After step 400, the process passes to step 500.

In step 500, the card controller operating portion processes the alias, charges a fee and responds to the merchant over the Internet. Then, in step 600 the merchant queries and accepts a PIE from the customer. After step 600, the process passes to step 700. In step 700, the merchant submits the PIE to the card controller operating portion over the Internet, private network, or wireless network, for example. In step 800 the card controller operating portion processes the PIE and responds to the merchant over the Internet, private network or wireless network, i.e., the merchant approves or denies the request. Then, in step 900, the merchant proceeds based on the response from the card controller operating portion. After step 900, the process passes to step 950. In step 950, the process ends.

Figure 9:
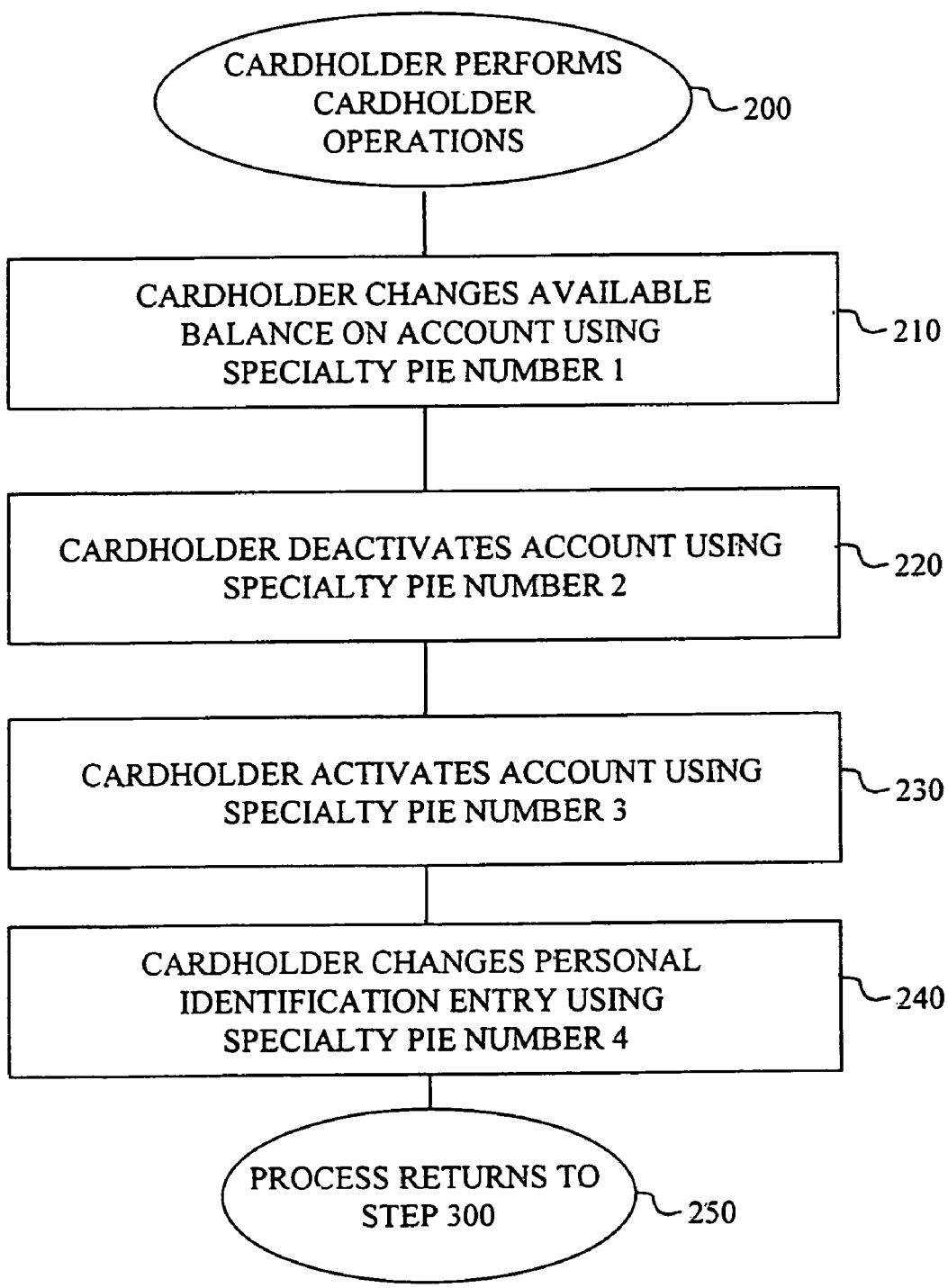
FIG. 9 is a flow chart showing the account-holder performs account-holder operations step of FIG. 8 in further detail according to one embodiment of the invention.

Hereinafter, further aspects of the "account-holder performs account-holder operations" step 200 of FIG. 8 will be described in further detail with reference to FIG. 9. Specifically, FIG. 9 shows further aspects of use of a specialty PIE. As shown in FIG. 9, this sub-process starts in step 200. Then, the process passes to step 210. In step 210 the account-holder changes the available balance on an account using specialty PIE number 1. After step 210, the process passes to step 220.

In step 220 the account-holder deactivates an account using specialty PIE number 2. Further, in step 230 account-holder activates an account using specialty PIE number 3. It should be appreciated that such deactivation and activation may be performed on different accounts or may be performed at different times, for example.

After step 230, the process passes to step 240. In step 240 the account-holder changes his or her personal identification entry (PIE) using specialty PIE number 4. Then, in step 250 the process returns to step 300.

Figure 10:
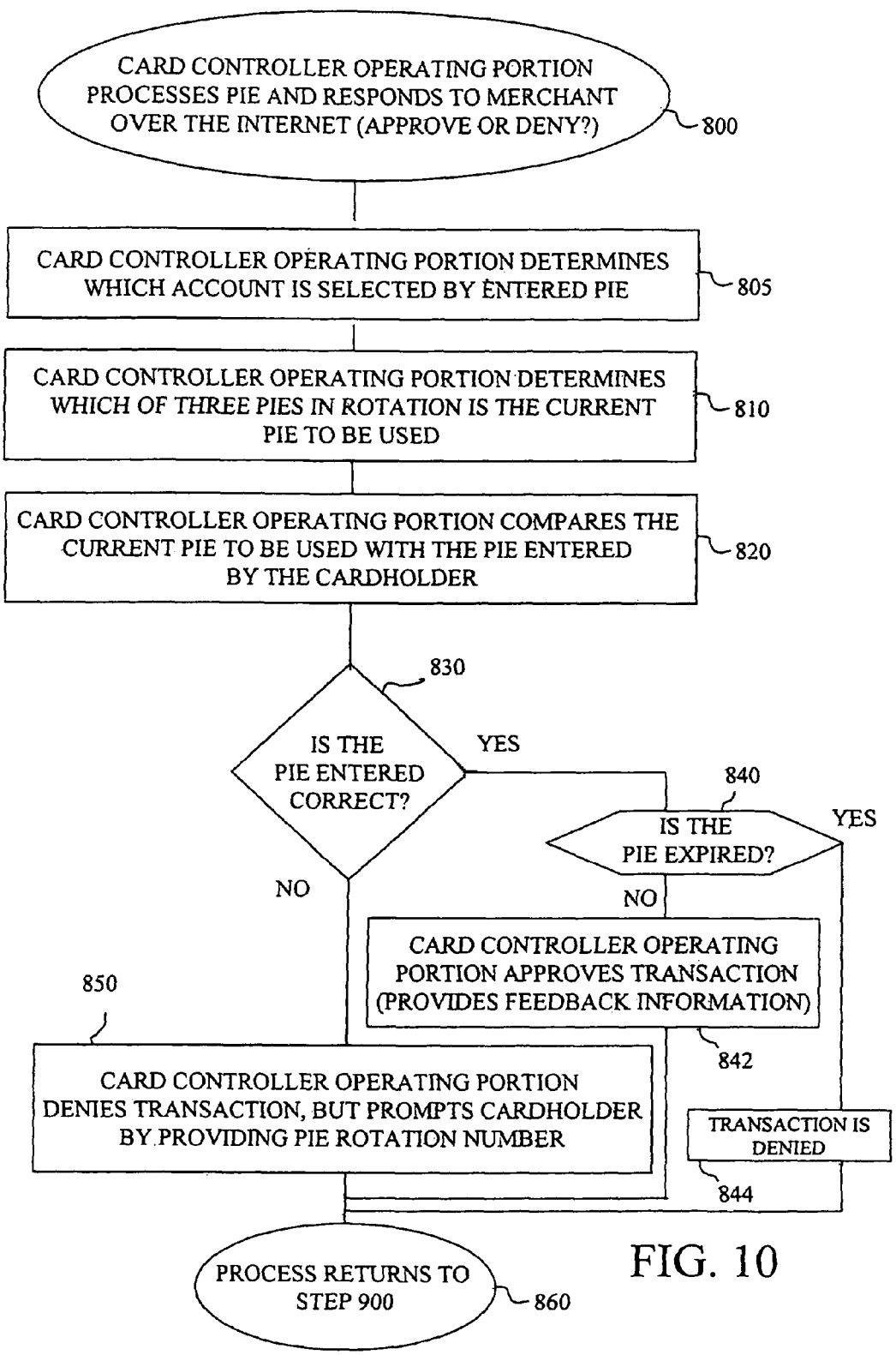
FIG. 10 is a flow chart showing the card controller operating portion processes PIE and responds to merchant over the Internet step of FIG. 8 in further detail according to one embodiment of the invention.

FIG. 10 is a flowchart showing in further detail the "card controller operating portion processes PIE and responds to merchant over the Internet" step 800 of FIG. 8 in accordance with one embodiment of the methods and systems of the invention. As shown in FIG. 10, the process starts in step 800. Then, in step 805 the card controller operating portion determines which account is selected by the entered PIE. That is, it should be appreciated that the account-holder may have multiple accounts which may be selected. Then, the process passes to step 810.

In step 810 the card controller operating portion determines which of three PIEs in rotation is the current PIE to be used. That is, the account-holder is using a security measure in which the account-holder rotates through three different PIEs. Then, the process passes to step 820. In step 820 the card controller operating portion compares the current PIE to be used with the PIE entered by the account-holder. Then, in step 830 the process determines "is the PIE entered correct?" If the answer is "yes," i.e., the entered PIE is correct, then the process passes to step 840.

In step 840 the process determines whether the PIE has expired?, i.e., whether the PIE has been used too many times before renewing the PIE. If the subsequent determination is "No," in step 840, then the processes passes to step 842.

In step 842, the card controller operating portion approves the transaction, and may provide feedback information. Such feedback information may then be conveyed on to the customer, i.e., such as by printing on the customer's receipt. After step 842, the process passes to step 860.

Alternatively, the process may determine that the PIE has expired in step 840. Then, the process passes to step 844. In step 844 the transaction is denied. After step 844, the process passes to step 860.

In step 830, if the entered PIE is determined to be incorrect, then the process passes to step 850, rather than step 840 as described above. In step 850, the card controller operating portion denies the transaction, but prompts the account-holder by providing the PIE rotation number. That is, for example, the card controller operating portion provides helpful feedback information to the account-holder which may assist the account-holder. After step 850, the process passes to step 860. In step 860, the process returns to step 900.

Figure 11:
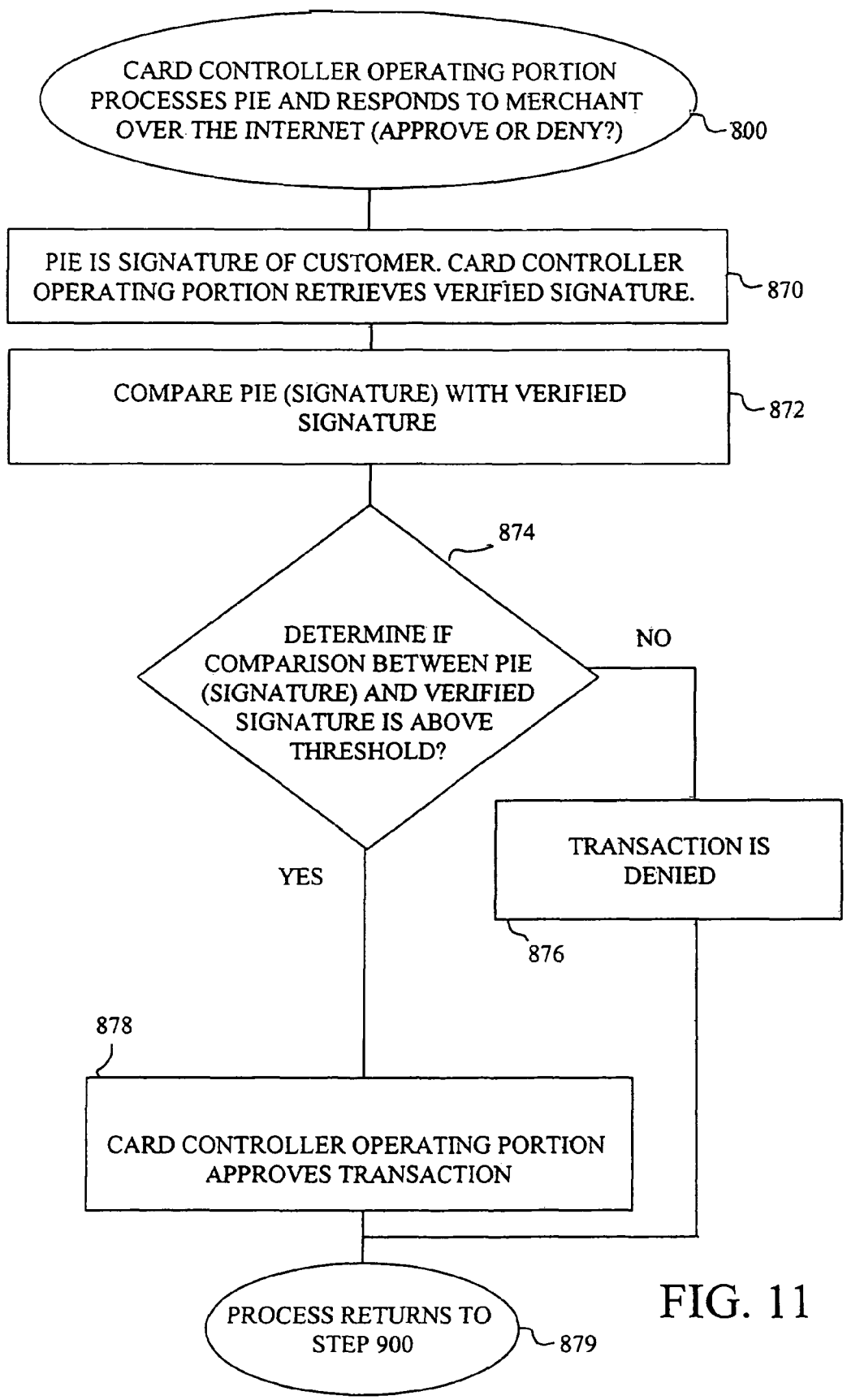
FIG. 11 is a flow chart showing the card controller operating portion processes PIE and responds to merchant over the Internet step of FIG. 8 in further detail according to a further embodiment of the invention.

FIG. 11 is a flowchart showing the "card controller operating portion processes PIE and responds to merchant over the Internet" step 800 of FIG. 8 in accordance with a further embodiment of the methods and systems of the invention. As shown in FIG. 10, the process starts in step 800. After step 800, as shown in FIG. 11, the process passes to step 870. In step 870 the process recognizes that the PIE is actually the signature of a customer. As a result, the card controller operating portion retrieves a verified signature from a database, for example. Then, the process passes to step 872.

In step 872, the PIE, i.e., the signature of the customer, is compared with the retrieved verified signature. Then, in step 874, a determination is made as to whether a comparison between the PIE signature and verified signature is above a threshold. For example, the pixel data representing both the verified signature and the submitted signature may be compared. If the comparison is not above the threshold, then the process passes to step 876. In step 876, the transaction is denied. After step 876, the process passes to step 879.

Alternatively, if above the threshold in step 874, then the process passes to step 878. In step 878 the card controller operating portion approves the transaction requested. After step 874, the process passes to step 879. In step 879, the process returns to step 900.

It should be appreciated that various features in accordance with embodiments of the methods and systems of the invention are described in conjunction with use of an alias and use of a PIE, respectively. However, it should further be appreciated that those features relating to an alias, as described above, may also be applied to a PIE. Further, those features relating to a PIE, as described above, may also be applied to an alias. For example, in accordance with embodiments of the methods and systems of the invention, the user may select an alias in the same manner as selection of a PIE, and vice-a-versa.

As described above, embodiments of the system of the invention as shown above may be in the form of a computer or computer system. As used herein, the term "computer" or "computer system" is to be understood to include at least one processor utilizing a memory or memories. The memory stores of the system of the invention retain at least portions of an executable program code at one time or another during operation of the processor portion of the computer. Additionally, the processor executes various instructions included in that executable program code. An executable program code means a program in machine language that is able to run in a particular computer system in an environment to perform a particular task. The executable program code processes data in response to commands by a user. As used herein, it will be appreciated that the term "executable program code" and the term "software" mean substantially the same thing for the purposes of the description as used herein.

It is to be appreciated that to practice the system and method of the invention, it is not necessary that various processors and/or the memories used in the practice of the invention be physically located in the same place. That is, it should be appreciated that each of the processors and the memories may be located in geographically distinct locations and connected so as to communicate in any suitable manner, such as over a suitable network or the Internet, for example. Additionally, it should be appreciated that each of the processors and/or the memories may be composed of the same or different physical pieces of equipment. Accordingly, it is not necessary that the processor be one single piece of equipment in one location and that the memory be another single piece of equipment in another location. That is, it is contemplated that the particular processor may be two pieces of equipment in two different physical locations. The two distinct pieces of equipment may be connected in any suitable manner. Additionally, a particular memory used in the invention may include two or more portions of memory in two or more physical locations. Further, the memory could include or utilize memory stores from the Internet, Intranet, Extranet, LAN, satellite interface or some other source or over some other network, as may be necessary or desired.

As described above, the method of the invention may illustratively be embodied in the form of a computer or computer operating system. It is to be appreciated that the software or programs that enable the computer operating system to perform the operations described above may be supplied on any of a wide variety of media to hold data. Further, it should be appreciated that the implementation and operation of the system and method of the invention may be in the form of computer code written in any suitable programming language or languages, which provide instructions to the computer by which the computer may manipulate data.

It should be appreciated that the software code or programming language that is utilized in a computer system to perform the above described invention may be provided in any of a wide variety of forms. Illustratively, the software may be provided in the form of machine language, assembly code, target language, object code, source code or source language, as well as in other forms. Further, the software may be in the form of compressed or encrypted data utilizing a suitable compression or encryption algorithm.

Additionally, it should be appreciated that the particular medium utilized to hold either the software used in conjunction with the invention or the data, which is manipulated by the software, may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention may be provided in the form of a hard disk or be transmitted in some form using a direct telephone connection, the Internet, an Intranet, or a satellite transmission, for example. Further, the programming language enabling the system and method of the invention as described above may be utilized on all of the foregoing and any other medium by which software or executable program code may be communicated to and utilized by a computer or other operating system.

As described herein, the system and method of the invention may utilize an application program, a collection of separate application programs, a module or modules of a program, or a portion of a module of a program, for example. As noted above, it should be appreciated that the computer language used in the system and method of the invention may be any of a wide variety of programming languages. Further, as is also noted above, it is not necessary that a single programming language be utilized in conjunction with the operation of the system and method of the invention. Rather, any number of different programming languages may be utilized as is necessary or desirable.

As described above, in the system and method of the invention, a variety of user interfaces may be utilized such as by a customer, for example. A user interface may be in the form of a key pad, for example. As used herein, a user interface includes any software, hardware or combination of hardware and software used in an operating system that allows a user, or other person, to interact with the operating system. A user interface may also include any of a touch screen, keyboard, mouse, voice recognition device, dialogue screen, menu box, a list, a checkbox, a toggle switch, a pushbutton or any other object that allows a user to receive information regarding the operation of the program and/or provide the operating system with information. Accordingly, a user interface used in conjunction with the system and method of the invention may be any device or collection of devices that provides communication between a user, i.e., an account-holder for example, and a computer. The information provided by the user to the computer through the user interface may be in the form of a command, a selection of data, or other input, for example.

While the foregoing description includes many details and specifications, it is to be understood that these have been included for purposes of explanation only, and are not to be interpreted as limitations of the present invention. Many modifications to the embodiments described above can be made without departing from the spirit and scope of the invention, as is intended to be encompassed by the claims and their legal equivalents.

What is claimed is:

1. A method for facilitating a request for financial services, said method including:
   receiving by a remote terminal a transaction request information from a cardholder, wherein said request includes an entered personal identification entry associated with a financial service, wherein the entered personal identification entry includes a static portion and a dynamic portion, the static portion and the dynamic portion are both with respect to the cardholder;
   using an account controller operating portion executed by a computer processor, searching at least one database to identify an account of the cardholder associated with the entered personal identification entry, including the static portion and the dynamic portion, and processing said transaction request information to determine a desired financial service; and
   activating the desired financial service.

2. The method of claim 1, wherein the transaction request information further comprises a cardholder alias number associated with an account having more than one transaction account; and
   the method further includes the step of processing said cardholder alias number and said entered personal identification entry to determine which transaction account is associated therewith.

3. The method of claim 2 wherein said step of processing said transaction request information to determine a desired financial service includes a financial service which activates a limitation on a transaction account.

4. The method of claim 2 wherein said step of processing said transaction request information to determine a desired financial service includes a financial service which activates a limitation on a transaction account, wherein said limitation includes at least one of: selecting a particular account for any portion of the transaction, dividing the payment among various accounts, PIN expiration, payment instructions, notification instructions, security notifications, specific merchant rules, merchant category rules, geographic rules, expenditure rules or limits, time or transaction limitations, authorized transactions, authorized goods or services, authorized vendors, stores, and service providers, transaction amount limitation, daily spending limit, authorized geographical area of usage, authorized time of usage, authorized transaction limit for a transaction account, transaction card or automated teller machine account, authorized individual for transacting on a transaction account, one or more banks or financial institutions authorized for the transaction, a limitation of a fee charge on a transaction account, authorized transaction location, and authorized number of transactions.

5. The method of claim 2 wherein said step of processing said transaction request information to determine a desired financial service further includes supplementing pre-existing limitations on a transaction account with the desired financial service.

6. The method of claim 1 wherein said step of receiving transaction request information from a cardholder via a remote terminal, wherein said request further includes said entered personal identification entry including at least one of a cardholder identification, a biometric, and a merchant code.

7. The method of claim 3, the limitation on a transaction account is to deactivate a transaction account of the account for a predetermined time.

8. The method of claim 1, wherein the dynamic portion of the entered personal identification entry is generated based, at least in part, on at least one selected from the group consisting of a time of day, a month, and a geographic area associated with the cardholder.

9. The method of claim 1, wherein the remote terminal is one of a computer, a POS terminal, a Kiosk, a cell phone, and a pocket PC.

10. The method of claim 1, wherein the remote terminal is a wireless device.

11. The method of claim 1, wherein the remote terminal is a wired device.

12. A method for processing a request for financial services to effect a transaction, said method including:
    receiving by a remote terminal a transaction request information from a cardholder, wherein said request includes an entered personal identification entry associated with a financial service, wherein the entered personal identification entry, of the cardholder, includes a static portion, the static portion being associated with a dynamic portion;
    using an account controller operating portion executed by a computer processor, searching at least one database to identify an account of the cardholder associated with the entered personal identification entry, including the static portion and the dynamic portion, and processing said transaction request information to determine a desired financial service; and
    activating the desired financial service.

13. The method of claim 12 wherein the transaction request information further comprises a cardholder alias number associated with an account having more than one transaction account; and
    the method further includes the step of processing said cardholder alias number and said entered personal identification entry to determine which transaction account is accessed for the desired financial service.

14. The method of claim 12 wherein said step of processing said transaction request information to determine a desired financial service includes a financial service which activates a limitation on a transaction account.

15. The method of claim 12 wherein said step of processing said transaction request information to determine a desired financial service includes a financial service which activates a limitation on a transaction account, wherein said limitation includes at least one of: selecting a particular account for any portion of the transaction, dividing the payment among various accounts, PIN expiration, payment instructions, notification instructions, security notifications, specific merchant rules, specific situation rules, geographic rules, expenditure rules or limits, time or transaction limitations, authorized transactions, authorized goods or services, authorized vendors, stores, and service providers, transaction amount limitation, daily spending limit, authorized geographical area of usage, authorized time of usage, authorized transaction limit for a transaction account, transaction card or automated teller machine account, authorized individual for transacting on a transaction account, one or more banks or financial institutions authorized for the transaction, a limitation of a fee charge on a transaction account, authorized transaction location, and authorized number of transactions.

16. The method of claim 12 wherein said step of processing said transaction request information to determine a desired financial service further includes supplementing pre-existing limitations on a transaction account with the desired financial service.

17. The method of claim 12 wherein said step of receiving transaction request information from a cardholder via a remote terminal, wherein said request includes an entered personal identification entry associated with a financial service further includes said entered personal identification entry including at least one of a cardholder identification, a biometric, and a merchant code.

18. The method of claim 12, wherein the entered personal identification entry is one of a plurality of possible personal identification entries associated with the cardholder, a desired account to effect the transaction is determined based on a hierarchical ranking of an order in which a plurality of transaction accounts are used to effect the transaction.

19. The method of claim 12, wherein the dynamic portion of the entered personal identification entry is generated based, at least in part, on at least one selected from the group consisting of a time of day, a month, and a geographic area associated with the cardholder.

20. The method of claim 12, wherein the remote terminal is one of a computer, a POS terminal, a Kiosk, a cell phone, and a pocket PC.

21. The method of claim 12, wherein the remote terminal is a wireless device.

22. The method of claim 12, wherein the remote terminal is a wired device.

23. A system for facilitating a request for financial services, comprising:
a remote terminal that receives transaction request information from a cardholder, wherein said transaction request includes an entered personal identification entry associated with a financial service, wherein the entered personal identification entry includes a static portion and a dynamic portion, the static portion and the dynamic portion are both with respect to the cardholder;
at least one database for storing a plurality of personal identification entries, each personal identification entry associated with a financial service and an account;
a computer processor in communication with the remote terminal;
at least one computer processor; and
a computer-readable storage medium comprising executable instructions, which, when executed by the at least one computer processor, causes the compute processor to perform the steps of:
searching the at least one database to identify an account of the cardholder associated with the entered personal identification entry, including the static portion and the dynamic portion, and processing said transaction request information and entered personal identification entry, including the static portion and the dynamic portion, to determine a desired financial service, and
activating the desired financial service.

24. The system of claim 23, wherein the remote terminal is one of a computer, a POS terminal, a Kiosk, a cell phone, and a pocket PC.

25. The system of claim 23, wherein the remote terminal is a wireless device.

26. The system of claim 23, wherein the remote terminal is a wired device.

27. A method for facilitating a request for financial services, said method including:
receiving by a remote terminal a transaction request information from a cardholder, wherein said request includes an entered personal identification entry associated with a financial service and a cardholder alias number associated with an account having more than one transaction account, wherein the entered personal identification entry includes a static portion and a dynamic portion, the static portion and the dynamic portion are both with respect to the cardholder;
using an account controller operating portion executed by a computer processor, searching at least one database to identify an account of the cardholder associated with the entered personal identification entry, including the static portion and the dynamic portion, processing said transaction request information and entered personal identification entry, including the static portion and the dynamic portion, to determine a desired financial service, and processing said cardholder alias number and said entered personal identification entry to determine which transaction account is associated therewith; and
activating the desired financial service;
wherein the step of processing said transaction request information to determine a desired financial service includes a financial service which activates a limitation on a transaction account, wherein said limitation includes at least one of: selecting a particular account for any portion of the transaction, dividing the payment among various accounts, PIN expiration, payment instructions, notification instructions, security notifications, specific merchant rules, merchant category rules, geographic rules, expenditure rules or limits, time or transaction limitations, authorized transactions, authorized goods or services, authorized vendors, stores, and service providers, transaction amount limitation, daily spending limit, authorized geographical area of usage, authorized time of usage, authorized transaction limit for a transaction account, transaction card or automated teller machine account, authorized individual for transacting on a transaction account, one or more banks or financial institutions authorized for the transaction, a limitation of a fee charge on a transaction account, authorized transaction location, authorized number of transactions; and supplementing pre-existing limitations on a transaction account with the desired financial service; and wherein said request further includes said entered personal identification entry including at least one of a cardholder identification, a biometric, and a merchant code.

28. The method of claim 27, wherein the remote terminal is one of a computer, a POS terminal, a Kiosk, a cell phone, and a pocket PC.

29. The method of claim 27, wherein the remote terminal is a wireless device.

30. The method of claim 27, wherein the remote terminal is a wired device.

* * * * *